(12) United States Patent
Chandak et al.

(10) Patent No.: US 12,288,074 B2
(45) Date of Patent: Apr. 29, 2025

(54) GENERATING AND PROVIDING PROPOSED DIGITAL ACTIONS IN HIGH-DIMENSIONAL ACTION SPACES USING REINFORCEMENT LEARNING MODELS

(71) Applicant: Adobe Inc., San Jose, CA (US)

(72) Inventors: Yash Chandak, Amherst, MA (US); Georgios Theocharous, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1302 days.

(21) Appl. No.: 16/261,092

(22) Filed: Jan. 29, 2019

(65) Prior Publication Data

US 2020/0241878 A1 Jul. 30, 2020

(51) Int. Cl.
*G06F 9/38* (2018.01)
*G06F 9/48* (2006.01)
(Continued)

(52) U.S. Cl.
CPC .......... *G06F 9/3818* (2013.01); *G06F 9/4806* (2013.01); *G06N 3/08* (2013.01); *G06N 20/00* (2019.01)

(58) Field of Classification Search
CPC ....... G06F 9/3818; G06F 9/4806; G06N 3/08; G06N 20/00; G06N 3/084; G06N 3/006; G06N 7/005; G06N 7/01
See application file for complete search history.

(56) References Cited

U.S. PATENT DOCUMENTS

2015/0143395 A1* 5/2015 Reisman ............ H04N 21/4358
 725/14
2019/0005021 A1* 1/2019 Miller .................... G06Q 10/06
2019/0251612 A1* 8/2019 Fang ..................... G06F 16/532

FOREIGN PATENT DOCUMENTS

WO WO-2018211140 A1 * 11/2018 ............. G06N 3/006

OTHER PUBLICATIONS

Lillicrap, Timothy P. et al. "Continuous control with deep reinforcement learning" Google Deepmind [Version 5 published Feb. 29, 2016] [Retrieved Dec. 2022] <URL: https://doi.org/10.48550/arXiv.1509.02971> (Year: 2016).*

(Continued)

*Primary Examiner* — David Yi
*Assistant Examiner* — Amy Tran
(74) *Attorney, Agent, or Firm* — Keller Preece PLLC

(57) ABSTRACT

The present disclosure relates to generating proposed digital actions in high-dimensional action spaces for client devices utilizing reinforcement learning models. For example, the disclosed systems can utilize a supervised machine learning model to train a latent representation decoder to determine proposed digital actions based on latent representations. Additionally, the disclosed systems can utilize a latent representation policy gradient model to train a state-based latent representation generation policy to generate latent representations based on the current state of client devices. Subsequently, the disclosed systems can identify the current state of a client device and a plurality of available actions, utilize the state-based latent representation generation policy to generate a latent representation based on the current state, and utilize the latent representation decoder to determine a proposed digital action from the plurality of available actions by analyzing the latent representation.

20 Claims, 16 Drawing Sheets

(51) Int. Cl.
  G06N 3/08 (2023.01)
  G06N 20/00 (2019.01)

(56) References Cited

OTHER PUBLICATIONS

Kearns, Michael, and Daphne Koller. "Efficient reinforcement learning in factored MDPs." IJCAI. vol. 16. 1999. (Year: 1999).*
Ghosh, Dibya et al. "Learning Actionable Representations with Goal-Conditioned Policies" UCB [Version 1 published Nov. 19, 2018] [ Retrieved Dec. 2022] <URL: https://doi.org/10.48550/arXiv.1811.07819> (Year: 2018).*
Nair, Ashvin et al. "Visual Reinforcement Learning with Imagined Goals" NeuralIPS'18 [Published Dec. 2018] [Retrieved May 2023] <URL: https://doi.org/10.48550/arXiv.1807.04742> (Year: 2018).*
Shelhamer, Evan et al. "Loss is its own Reward: Self-Supervision for Reinforcement Learning" arXiv. [Published Mar. 2017] [Retrieved May 2023] <URL: https://doi.org/10.48550/arXiv.1612.07307> (Year: 2017).*
Authors: Zhuang et al Title: Supervised Representation Learning: Transfer Learning with Deep Autoencoders Date: 2015 (Year: 2015).*
Akata, Z.; Perronnin, F.; Harchaoui, Z.; and Schmid, C. 2016. Label-embedding for image classification. IEEE transactions on pattern analysis and machine intelligence 38(7):1425-1438.
Barreto, A.; Dabney, W.; Munos, R.; Hunt, J. J.; Schaul, T.; van Hasselt, H. P.; and Silver, D. 2017. Successor features for transfer in reinforcement learning. In Advances in neural information processing systems, 4055-4065.
Dayan, P. 1993. Improving generalization for temporal difference learning: The successor representation. Neural Com-putation 5(4):613-624.
Dulac-Arnold, G.; Evans, R.; van Hasselt, H.; Sunehag, P.; Lillicrap, T.; Hunt, J.; Mann, T.; Weber, T.; Degris, T.; and Coppin, B. 2015. Deep reinforcement learning in large dis-crete action spaces. arXiv preprint arXiv:1512.07679.
Flash, T., and Hochner, B. 2005. Motor primitives in vertebrates and invertebrates. Current opinion in neurobiology 15(6):660-666.
Ijspeert, A. J.; Nakanishi, J.; and Schaal, S. 2003. Learning attractor landscapes for learning motor primitives. In Advances in neural information processing systems, 1547-1554.
Jaderberg, M.; Mnih, V.; Czarnecki, W. M.; Schaul, T.; Leibo, J. Z.; Silver, D.; and Kavukcuoglu, K. 2016. Reinforcement learning with unsupervised auxiliary tasks. arXiv preprint arXiv:1611.05397.
Jing, J.; Cropper, E. C.; Hurwitz, I.; and Weiss, K. R. 2004. The construction of movement with behavior-specific and behavior-independent modules. Journal of Neuroscience 24(28):6315-6325.
Kober, J., and Peters, J. 2009a. Learning motor primitives for robotics. In Robotics and Automation, 2009. ICRA'09. IEEE International Conference on, 2112-2118. IEEE.
Kober, J., and Peters, J. R. 2009b. Policy search for motor primitives in robotics. In Advances in neural information processing systems, 849-856.
Konidaris, G.; Osentoski, S.; and Thomas, P. S. 2011. Value function approximation in reinforcement learning using the fourier basis. In AAAI, vol. 6, 7.
Mahadevan, S., and Maggioni, M. 2007. Proto-value functions: A laplacian framework for learning representation and control in markov decision processes. Journal of Machine Learning Research 8(Oct.): 2169-2231.
Mikolov, T.; Sutskever, I.; Chen, K.; Corrado, G. S.; and Dean, J. 2013. Distributed representations of words and phrases and their compositionality. In Advances in neural information processing systems, 3111-3119.
Osentoski, S., and Mahadevan, S. 2007. Learning state-action basis functions for hierarchical mdps. In Proceedings of the 24th international conference on Machine learning, 705-712. ACM.
Pathak, D.; Agrawal, P.; Efros, A. A.; and Darrell, T. 2017. Curiosity-driven exploration by self-supervised prediction. In International Conference on Machine Learning (ICML), vol. 2017.
Pazis, J., and Parr, R. 2011. Generalized value functions for large action sets. In Proceedings of the 28th International Conference on Machine Learning (ICML-11), 1185-1192.
Sallans, B., and Hinton, G. E. 2004. Reinforcement learning with factored states and actions. Journal of Machine Learning Research 5(Aug.):1063-1088.
Schaal, S. 2006. Dynamic movement primitives—a framework for motor control in humans and humanoid robotics. In Adaptive motion of animals and machines. Springer. 261-280.
Schulman, J.; Wolski, F.; Dhariwal, P.; Radford, A.; and Klimov, O. 2017. Proximal policy optimization algorithms. arXiv preprint arXiv:1707.06347.
Shani, G.; Heckerman, D.; and Brafman, R. I. 2005. An mdp-based recommender system. Journal of Machine Learning Research 6(Sep. ):1265-1295.
Sharma, S.; Suresh, A.; Ramesh, R.; and Ravindran, B. 2017. Learning to factor policies and action-value functions: Factored action space representations for deep reinforcement learning. arXiv preprint arXiv:1705.07269.
Shelhamer, E.; Mahmoudieh, P.; Argus, M.; and Darrell, T. 2016. Loss is its own reward: Self-supervision for reinforcement learning. arXiv preprint arXiv:1612.07307.
Silver, D.; Lever, G.; Heess, N.; Degris, T.; Wierstra, D.; and Riedmiller, M. 2014. Deterministic policy gradient algorithms. In ICML.
Sutton, R. S.; McAllester, D. A.; Singh, S. P.; and Mansour, Y. 2000. Policy gradient methods for reinforcement learning with function approximation. In Advances in neural information processing systems, 1057-1063.
Theocharous, G.; Thomas, P. S.; and Ghavamzadeh, M. 2015. Ad recommendation systems for life-time value optimization. In Proceedings of the 24th International Conference on World Wide Web, 1305-1310. ACM.
Thomas, P. S., and Barto, A. G. 2011. Conjugate markov decision processes. In Proceedings of the 28th International Conference on Machine Learning (ICML-11), 137-144.
Thomas, P. S., and Barto, A. G. 2012. Motor primitive discovery. In Development and Learning and Epigenetic Robotics (ICDL), 2012 IEEE International Conference on, 1-8. IEEE.
Thomas, P. S. 2011. Policy gradient coagent networks. In Advances in Neural Information Processing Systems, 1944-1952.
Thomas, P. 2014. Bias in natural actor-critic algorithms. In International Conference on Machine Learning, 441-448.
Todorov, E., and Ghahramani, Z. 2003. Unsupervised learning of sensory-motor primitives. In Engineering in Medicine and Biology Society, 2003. Proceedings of the 25th Annual International Conference of the IEEE, vol. 2, 1750-1753. IEEE.
Van Hasselt, H., and Wiering, M. A. 2009. Using continuous action spaces to solve discrete problems. In Neural Networks, 2009. IJCNN 2009. International Joint Conference on, 1149-1156. IEEE.

* cited by examiner

PG-RA Algorithm

Input: self_supervise frequency $k$
Initialize memory buffer $\Omega$
for $episode = 0, 1, 2...$ do
    if $episode \% k == 0$ then
        $Self\_supervise(\Omega)$ 502 {
    for $t = 0, 1, 2...$ do
        Sample action representation from $\pi_i(e|s_t)$
        Map representation to an action $a_t$ using $f(e)$
        Execute $a_t$ and observe $s_{t+1}, r_t$
        Update $\pi_i$ using *any* policy gradient algorithm
        Add the transition $(s_t, a_t, r_t, s_{t+1})$ to $\Omega$ 504 {
Function $Self\_supervise(\Omega)$
    for $t = 0, 1, 2...$ do
        Randomly sample $(s, a, r, s')$ from $\Omega$
        $\bar{P}_a = softmax(f(g(s, s')))$
        Minimize $-\log \bar{P}_a$

*Fig. 5*

GENERATING AND PROVIDING PROPOSED DIGITAL ACTIONS IN HIGH-DIMENSIONAL ACTION SPACES USING REINFORCEMENT LEARNING MODELS

BACKGROUND

Recent years have seen significant improvements in hardware and software platforms for generating proposed digital actions. For example, action proposal systems can automatically analyze and propose actions (e.g., locations for a user to visit or digital content to be distributed to a client device) that are otherwise too numerous to explore. In particular, some action proposal systems can employ reinforcement learning methods for determining the reward associated with each available action. The action proposal systems can then recommend actions based on the determined reward.

Despite these advances, however, conventional action proposal systems suffer from several technological shortcomings that lead to inflexible, inaccurate, and inefficient operation. For example, conventional action proposal systems are often inflexible in that they employ models that rigidly propose actions that are only locally optimized (i.e., provide the best immediate reward). In particular, many conventional systems utilize bandit models that are useful for short-term decision making (e.g., time-step based tasks). These models, however, often fail to flexibly accommodate problems involving longer sequences. Specifically, these models fail to provide long-term decision making that is often required in real-world settings.

In addition to flexibility concerns, conventional action proposal systems are also inaccurate. In particular, because conventional action proposal systems often employ models for short-term decision making, such systems often predict which actions will provide the best long-term rewards inaccurately. In addition, many conventional systems employ methods (e.g., model-free reinforcement learning methods) that utilize policy gradients to learn the policy employed to propose actions. Such policy gradients typically result in high variance, especially where the number of parameters that must be learned for the policy is high (e.g., high-dimensional, complex real-world problems where the agent must decide among hundreds or thousands of actions at each time step). Consequently, these conventional systems inaccurately predict which of those actions provide the optimal rewards.

In addition to problems with inflexibility and inaccuracy, conventional action proposal systems are also inefficient. In particular, due to the high dimensional action spaces (i.e., the large number of parameters) associated with complex real-world problems and the high variance methods often employed by conventional systems, such systems require a significant amount of time to converge to the policy employed in proposing actions. Consequently, conventional systems require a significant amount of resources (e.g., time, processing power, and computing memory) in order to fully train and apply these methods.

These, along with additional problems and issues, exist with regard to conventional action proposal systems.

SUMMARY

One or more embodiments described herein provide benefits and/or solve one or more of the foregoing or other problems in the art with systems, methods, and non-transitory computer readable storage media that generate digital action proposals that accurately model long-term decision-making in high-dimensional action spaces utilizing reinforcement learning models. In particular, the disclosed systems can decompose generating a digital action proposal into two components: a representation component that generates action representations and a selection component that learns and selects actions in the space of the action representations. The disclosed systems can utilize a self-supervised learning approach to train the selection component to determine proposed digital actions based on action representations. The disclosed systems can also use a reinforcement learning approach to train the representation component to generate action representations based on a policy gradient method. Once trained, the disclosed systems can identify a current state of a client device, utilize the representation component to generate an action representation based on the determined current state and then utilize the selection component to generate a proposed digital action based on the action representation. Using an action proposal policy determined using supervised learning and policy gradients, the disclosed systems can flexibly and accurately generate proposed digital actions for complex long-term decision making.

To illustrate, in one or more embodiments, the disclosed systems can utilize a supervised machine learning model to train a latent representation decoder (i.e., the representation component trained based on reinforcement learning) to determine proposed digital actions based on an analysis of latent representations (i.e., action representations). Additionally, the system can utilize a latent representation policy gradient model to train a state-based latent representation generation policy (i.e., the selection component trained based on supervised learning) to generate latent representations based on the current state of client devices. In one or more embodiments, the latent representation policy gradient model includes the latent representation decoder to facilitate training. After training, the system can identify the current state of a client device and a plurality of available actions, utilize the state-based latent representation generation policy to generate a latent representation based on the current state, and utilize the latent representation decoder to determine a proposed digital action from the plurality of available actions by analyzing the latent representation.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 5 illustrates a table including an algorithm for training a state-based latent representation generation policy and a latent representation decoder in accordance with one or more embodiments;

DETAILED DESCRIPTION

Figure 1:
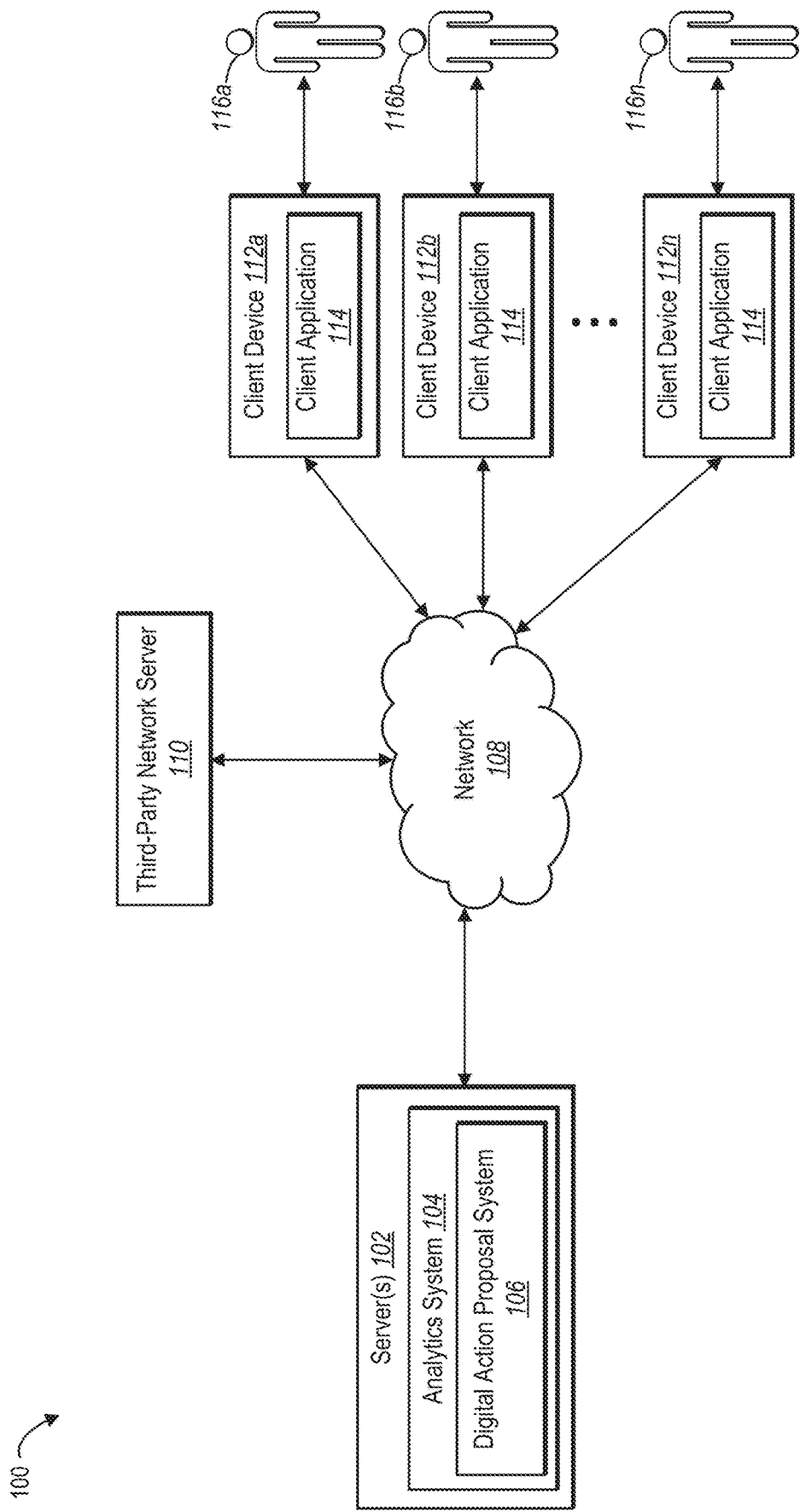
FIG. 1 illustrates an example environment in which a digital action proposal system can operate in accordance with one or more embodiments.

One or more embodiments described herein include a digital action proposal system for generating digital action proposals that accurately model real-world decision making in high-dimension action spaces utilizing a state-based digital action proposal policy determined using supervised learning and policy gradients. In particular, the digital action proposal system can learn action representations to improve generalization used in reinforcement learning to efficiently determine the state-based digital action proposal policy. For example, in one or more embodiments, the digital action proposal system trains a latent representation decoder (utilizing supervised learning) to determine proposed digital actions from latent representations and a state-based latent representation generation policy (utilizing reinforcement learning) to generate latent representations. Once trained, the digital action proposal system can utilize the state-based latent representation generation policy and the latent representation decoder to generate a proposed digital action based on the current state of a client device.

To provide an example, in one or more embodiments, the digital action proposal system trains a latent representation decoder, utilizing a supervised machine learning model, to analyze latent representations and determine proposed digital actions based on the analysis. Additionally, the digital action proposal system can train a state-based latent representation generation policy, utilizing a latent representation policy gradient model, to generate latent representations based on the current state of client devices. In one or more embodiments, the latent representation policy gradient model includes the latent representation decoder to facilitate training. After training, the digital action proposal system can identify the current state of a client device and a plurality of available actions. The digital action proposal system can utilize the trained state-based latent representation generation policy to generate a latent representation based on the current state and then utilize the trained latent representation decoder to determine a proposed digital action from the plurality of available actions by analyzing the latent representation.

As just mentioned, in one or more embodiments, the digital action proposal system utilizes a supervised machine learning model to train a latent representation decoder to determine proposed digital actions (from a plurality of available actions) based on an analysis of latent representations (i.e., action representations). In particular, each action from the plurality of available actions is a discrete action. The latent representation comprises a value from a set of continuous values that corresponds to the plurality of discrete actions. Therefore, the digital action proposal system utilizes the supervised machine learning model to train the latent representation decoder to determine a discrete action by analyzing a latent representation from a continuous space.

As mentioned above, in one or more embodiments the digital action proposal system trains the latent representation decoder by utilizing a supervised machine learning model. In particular, the digital action proposal system can train a supervised machine learning model that includes a latent representation generator and a latent representation decoder. For example, the supervised machine learning model can utilize the latent representation generator to generate a latent representation based on a training current state and a training next state. The supervised machine learning model can then use the latent representation decoder to generate a predicted action based on the generated latent representation. In one or more embodiments, the digital action proposal system then compares the predicted action to a ground truth action and modifies the latent representation generator and the latent representation decoder based on the comparison.

As further mentioned above, in one or more embodiments the digital action proposal system utilizes a latent representation policy gradient model to train a state-based latent representation generation policy to generate latent representations. In particular, in one or more embodiments, the latent representation policy gradient model includes the latent representation decoder (discussed in the previous paragraph) and a state-based latent representation generation policy. The digital action proposal system can utilize the latent representation policy gradient model to generate a latent representation based on a training current state. The digital action proposal system can then use the latent representation decoder to determine a proposed action based on the generated latent representation. In one or more embodiments, the digital action proposal system then modifies the state-based latent representation generation policy using a policy gradient based on a training next state and a training reward resulting from the proposed action.

As further mentioned above, the digital action proposal system uses the latent representation decoder and the state-based latent representation generation policy to generate digital action proposals. In particular, the digital action proposal system utilizes the state-based latent representation generation policy to generate a latent representation based on a current state of a client device. The digital action proposal system then uses the latent representation decoder to analyze the latent representation and determine a proposed digital action from a plurality of available actions.

The digital action proposal system provides several advantages over conventional systems. For example, the digital action proposal system improves flexibility. In particular, by utilizing a state-based latent representation generation policy to generate latent representations—rather than the discrete actions directly—the digital action proposal system can handle large action spaces by exploiting the structure of each action space. In particular, by generating latent representations and then applying a policy to the latent representations to select actions, the digital action proposal system reduces the large action space to a lower dimensional continuous space. Consequently, the digital action proposal system improves the action selection process, allowing the digital action proposal system to flexibly accommodate long-term decision making. In particular, the digital action proposal system can flexibly select digital actions that provide optimal long-term rewards, even if those actions are not locally optimized.

Additionally, the digital action proposal system improves accuracy. For example, by generating latent representations and selecting actions by applying a learned policy to the latent representations, the digital action proposal system can more accurately propose digital actions that provide optimal rewards long-term. Indeed, by utilizing a latent representation generator trained by a supervised machine learning model to determine the proposed digital action based on a latent representation, the digital action proposal system reduces the number of parameters that must be learned by the state-based latent representation generation policy. Because the state-based latent representation generation policy is trained using a policy gradient—which typically provides high variance—the reduction of parameters that must be learned reduces the error introduced by the policy gradient. Consequently, the digital action proposal system can more accurately determine which actions will provide the best rewards.

Further, the digital action proposal system operates more efficiently than conventional systems. In particular, by utilizing a supervised machine learning model and reducing the number of parameters that must be learned via the policy gradient, the digital action proposal system reduces the time required before it converges to the optimal policy employed in generating digital action proposals. Consequently, the digital action proposal system avoids using the excessive amount of time, processing power, and memory required by conventional systems.

As illustrated by the foregoing discussion, the present disclosure utilizes a variety of terms to describe features and benefits of the digital action proposal system. Additional detail is now provided regarding the meaning of these terms. For example, as used herein, the term "state" or "state of a client device" refers to a condition (or characteristics) of a client device. In particular, a state refers to a condition or characteristic of a client device with respect to one or more options (i.e., actions) at a particular time. For example, a current state can refer to digital content previously distributed to the client device or steps previously taken by the client device with respect to a process. A state or state of a client device can also refer to the state of a user of the client device. For example, a current state can refer to digital content previously distributed to a user via one or more client devices or steps taken by the user with respect to a process.

Additionally, as used herein, the term "digital action" refers to an act. In particular, a digital action refers to an act that can be taken by a computer system, an act that can be taken using a computer system, or an act that can be tracked or confirmed through a computer system. For example, a digital action can refer to distributing digital content to a client device or taking a step within a process. Relatedly, a "proposed digital action" refers to a digital action suggested for execution. For example, a proposed digital action can include suggested digital content to distribute or a suggested step to take within a process.

Further, as used herein, the term "latent representation" refers to a representation of a variable or value. In particular, a latent representation refers to a hidden value generated by a model (e.g., that is not interpretable by the human mind), which is then used by the model to generate a subsequent value (e.g., an output value such as a proposed action). For example, a latent representation can refer to a value representing an action (i.e., an action representation in an action space). More specifically, a latent representation can refer to a value from a set of continuous values corresponding to a plurality of discrete actions.

Additionally, as used herein, the term "state-based latent representation generation policy" refers to computer implemented rules, algorithm or model that generates latent representations. In particular, a state-based latent representation generation policy includes a computer algorithm that generates a latent representation based on a current state a client device. As used herein, a "latent representation policy gradient model" refers to a computer algorithm or model that trains state-based latent representation generation policies. In particular, a latent representation policy gradient model includes a computer algorithm that trains, using a policy gradient, state-based latent representation generation policies to generate latent representations based on current states. For example, a latent representation policy gradient model can include a reinforcement learning model (as described in greater detail below).

Further, as used herein, the term "latent representation decoder" refers to a computer algorithm or model that determines proposed digital actions. In particular, a latent representation decoder includes a computer algorithm that analyzes a latent representation (e.g., a latent representation generated by a state-based latent representation generation policy or by a latent representation generator) and determines a proposed digital action from a plurality of available actions based on the analysis. For example, the latent representation decoder can refer to a machine learning model or a mapping function.

Additionally, as used herein, the term "latent representation generator" refers to a computer algorithm or model that generates latent representations. In particular, a latent representation generator includes a computer algorithm that generates a latent representation based on a current state and a next state of a client device. For example, the latent representation generator can include a machine learning model, such as a differentiable function approximator (or any other applicable neural network).

Further, as used herein, the term "supervised machine learning model" refers to a machine learning model trained based on supervised training data. In particular, a supervised machine learning model includes a computer algorithm that trains, using supervised learning, a latent representation decoder to determine a proposed digital action based on a latent representation. A supervised machine learning model can also train a latent representation generator to generate latent representations. As used herein, the term "supervised learning" refers to a training a model to generate an output based on an input using example input-output pairs. In particular, supervised learning includes training a model to generate an output based on an input using training input-output pairs.

As used herein, a "machine learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include, but is not limited to, a differentiable function approximator, a neural network (e.g., a convolutional neural network or deep learning model), a decision tree (e.g., a gradient boosted decision tree), association rule learning, inductive logic programming, support vector learning, Bayesian network, regression-based model, principal component analysis, or a combination thereof.

Additional detail regarding the digital action proposal system will now be provided with reference to the figures. For example, FIG. 1 illustrates a schematic diagram of an exemplary system environment ("environment") 100 in which a digital action proposal system 106 can be implemented. As illustrated in FIG. 1, the environment 100 can include a server(s) 102, a network 108, a third-party network server 110, client devices 112a-112n, and users 116a-116n.

Although the environment 100 of FIG. 1 is depicted as having a particular number of components, the environment 100 can have any number of additional or alternative components (e.g., any number of servers, third-party network servers, client devices, or other components in communication with the digital action proposal system 106 via the network 108). Similarly, although FIG. 1 illustrates a particular arrangement of the server(s) 102, the network 108, the third-party network server 110, the client devices 112a-112n, and the users 116a-116n, various additional arrangements are possible.

The server(s) 102, the network 108, the third-party network server 110, and the client devices 112a-112n may be communicatively coupled with each other either directly or indirectly (e.g., through the network 108 discussed in greater detail below in relation to FIG. 12). Moreover, the server(s) 102, the third-party network server 110, and the client devices 112a-112n may include a computing device (including one or more computing devices as discussed in greater detail below with relation to FIG. 12).

As mentioned above, the environment 100 includes the server(s) 102. The server(s) 102 can generate, store, receive, and/or transmit data, including proposed digital actions. For example, the server(s) 102 can receive data regarding a plurality of available actions corresponding to a client device (e.g., one of the client devices 112a-112n) from the third-party network server 110 and transmit a proposed digital action back to the third-party network server 110 or to the client device. In one or more embodiments, the server(s) 102 comprises a data server. The server(s) 102 can also comprise a communication server or a web-hosting server.

As shown in FIG. 1, the server(s) 102 can include an analytics system 104. In particular, the analytics system 104 can collect, manage, and utilize analytics data. For example, the analytics system 104 can collect analytics data related to the states of a client device, the plurality of available actions corresponding to the client device at each state, and the rewards associated from each executed action. The analytics system 104 can collect the analytics data in a variety of ways. For example, in one or more embodiments, the analytics system 104 causes the server(s) 102 and/or the third-party network server 110 to track client device data and report the tracked user data for storage on a database. In one or more embodiments, the analytics system 104 receives client device data directly from the client devices 112a-112n via data stored thereon.

Additionally, the server(s) 102 can include the digital action proposal system 106. In particular, in one or more embodiments, the digital action proposal system 106 uses the server(s) 102 to generate proposed digital actions from a plurality of available actions. For example, the digital action proposal system 106 can use the server(s) 102 to identify a plurality of available actions corresponding to a client device and generate one or more proposed digital actions.

For example, in one or more embodiments, the server(s) 102 can identify the current state of a client device and a plurality of available actions corresponding to the client device (e.g., digital actions that are available to the client device while at the current state). The server(s) 102 can then generate a latent representation based on the current state of the client device using a state-based latent representation generation policy. Subsequently, the server(s) 102 can determine the proposed digital action from the plurality of available actions by analyzing the latent representation using a latent representation decoder. In one or more embodiments, the server(s) 102 trains the state-based latent representation generation policy using a feature policy gradient model, which includes the latent representation decoder. Further, the server(s) 102 can train the latent representation decoder using a supervised machine learning model.

As shown in FIG. 1, the environment 100 also includes the third-party network server 110. In one or more embodiments, the third-party network server 110 provides access to a third-party service to the client devices 112a-112n. For example, the third-party network server 110 can host and provide access to a service, such as an online (e.g., cloud-based) photo-editing service provided through a website. In some embodiments, the third-party network server 110 hosts a service accessible through an application (e.g., the client application 114, such as a photo-editing application or social networking application) hosted on the client devices 112a-112n. The server(s) 102 can provide digital content (e.g., proposed actions) directly to the client devices 112a-112n or provide digital content to the client devices 112a-112n via the third-party network server 110.

In one or more embodiments, the client devices 112a-112n include computer devices that allow users of the devices (e.g., the users 116a-116n) to access a service provided by the third-party network server 110. For example, the client devices 112a-112n can include smartphones, tablets, desktop computers, laptop computers, or other electronic devices. The client devices 112a-112n can include one or more applications (e.g., the client application 114) that allow the users 116a-116n to access the service provided by the third-party network server 110. For example, the client application 114 can include a software application installed on the client devices 112a-112n. Additionally, or alternatively, the client application 114 can include a software application hosted on the third-party network server 110, which may be accessed by the client devices 112a-112n through another application, such as a web browser.

The digital action proposal system 106 can be implemented in whole, or in part, by the individual elements of the environment 100. Indeed, although FIG. 1 illustrates the digital action proposal system 106 implemented with regards to the server(s) 102, different components of the digital action proposal system 106 can be implemented in any of the components of the environment 100. The components of the digital action proposal system 106 will be discussed in more detail with regard to FIG. 9 below.

Figure 2:
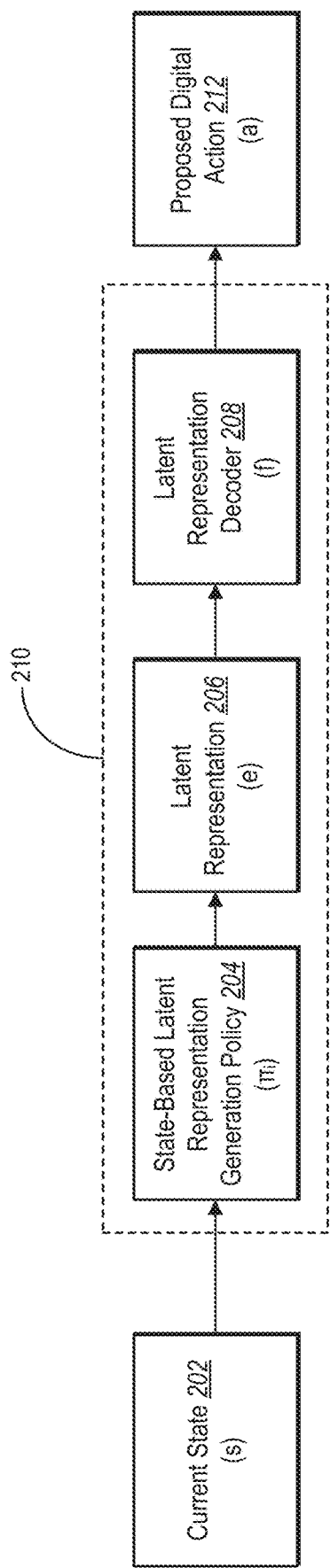
FIG. 2 illustrates a block diagram of a digital action proposal system generating a proposed digital action in accordance with one or more embodiments.

As mentioned above, the digital action proposal system 106 generate a proposed digital action for a client device. FIG. 2 illustrates a block diagram for generating proposed digital actions in accordance with one or more embodiments. As shown in FIG. 2, the digital action proposal system 106 utilizes a state-based digital action proposal policy 210 to generate proposed digital actions.

As an illustration, FIG. 2 shows that the digital action proposal system 106 utilizes the state-based digital action proposal policy 210 to generate the proposed digital action 212 based on a current state 202 of a client device. In particular, in one or more embodiments, the digital action proposal system 106 identifies the current state 202 of the client device (e.g., by tracking the current state of the client device or receiving information regarding the current state). Identifying the current state 202 of the client device can involve identifying an initial state of the client device. In one or more embodiments, the digital action proposal system 106 identifies the initial state of the client device from an initial distribution of states (e.g., by sampling the initial distribution). In some embodiments, the digital action proposal system 106 retrieves data regarding the initial state of the client device and determines the initial state from the data.

In one or more embodiments, the digital action proposal system 106 further identifies a plurality of available actions corresponding to the client device (not shown). In some embodiments, the plurality of available actions is identified based on the current state 202 of the client device. In other words, in some embodiments, one or more actions are only available when the client device is in a particular state. The digital action proposals system 106 utilizes the state-based digital action proposal policy 210 to generate the proposed digital action 212 from the plurality of available actions (i.e., the digital action proposal system 106 selects the proposed digital action 212 from the plurality of available actions).

As shown in FIG. 2, in one or more embodiments, the state-based digital action proposal policy 210 includes a state-based latent representation generation policy 204 and a latent representation decoder 208. The state-based latent representation generation policy 204 generates a latent representation 206 based on the current state 202 of the client device. The latent representation decoder 208 then analyzes the latent representation 206 to determine the proposed digital action 212. In one or more embodiments, the digital action proposal system 106 trains the state-based latent representation generation policy 204 and the latent representation decoder 208 using different models as will be discussed in more detail below with respect to FIGS. 4A-4B.

In one or more embodiments, execution of the proposed digital action 212 (i.e., by the client device or by a user of the client device) results in a next sate of the client device. The digital action proposal system 106 can identify the next state of the client device and utilize the state-based digital action proposal policy 210 to generate an additional proposed digital action. Thus, the digital action proposal system 106 can guide a client device through a decision-making process involving a sequence of actions by generating a proposed digital action at each state.

In one or more embodiments, the digital action proposal system 106 models the decision-making process as a discrete-time Markov decision process (MDP) with continuous (or discrete) states and discrete actions. In general, the digital action proposal system 106 defines the MDP by a tuple $\mathcal{M} = (\mathcal{S}, \mathcal{A}, \mathcal{P}, \mathcal{R}, \gamma, d_0)$ where $\mathcal{S} \subseteq \mathbb{R}^d$ is the set of all possible states (i.e., the state space), $\mathcal{A} \subseteq \{0,1\}^{|\mathcal{A}|}$ is the set of all actions (i.e., called the action space), and the initial state comes from the initial distribution $d_0$. Each time step is associated with the tuple $(s_t, a_t, r_t, s_{t+1})$ where $s_t, s_{t+1} \in \mathcal{S}$, $a_t \in \mathcal{A}$ and the reward $r_t$, given by the function $\mathcal{R}(s_t, a_t)$, is scalar and bounded. Where the specific time instance is irrelevant, the tuple can be represented as (s, a, r, s'). The reward discount parameter is given by $\gamma$, and P represents a probability density function where the state transition probability is defined as $\mathcal{P}(s_t, a_t, s_{t+1}) = P(s_{t+1}|s_t, a_t)$.

For a given $\mathcal{M}$, the digital action proposal system 106 operates to utilize a state-based digital action proposal policy $\pi(s, a) := \mathcal{S} \times \mathcal{A} \to [0,1]$, which results in maximum expected sum of discounted future rewards. For the state-based digital action proposal policy $\pi$, the state action value function is represented as $Q(s, a) = \mathbb{E}[\sum_{t=0}^{\infty} \gamma^t r_t | s, a, \pi, \mathcal{M}]$. An optimal state-based digital action proposal policy is represented as $\pi^* \in \operatorname{argmax}_{\pi \in \Pi} \mathbb{E}[\sum_{t=0}^{\infty} \gamma^t r_t | \pi, \mathcal{M}]$ where $\Pi$ denotes the set of all possible state-based digital action proposal policies. The expectation is over an entire trajectory $(s_0, a_0, \ldots)$ for which $s_0 \sim d_0(s_0)$, $a_t \sim \pi(a_t|s_t)$, and $s_{t+1} \sim \mathcal{P}(s_t, a_t, s_{t+1})$. To determine the expected value associated with each state s, the digital action proposal system 106 utilizes the following Bellman equation:

$$V(s) = \sum_a \pi(a|s) Q(s,a) \quad (1)$$

To break down the state-based digital action proposal policy 210 into its separate components—the state-based latent representation generation policy 204 and the latent representation decoder 208—the digital action proposal system 106 accepts that, for any consecutive states, s and s', there exists a latent representation e (e.g., the latent representation 206) that can be used to infer the digital action a, which could have resulted in this transition by interaction with the corresponding environment. In particular, the digital action proposal system 106 accepts that, for an MDP $\mathcal{M}$, there exists a latent representation $E_t$ such that the probability of the digital action: $A_t = a$, is conditionally independent of states: $S_t$ and $S_{t+1} = s'$, given $E_t = e$. This can be expressed as:

$$P(a|s,s') = \int_e P(a,e|s,s') de = \int_e P(a|e) P(e|s,s') de \quad (2)$$

In equation 2, P(a|s, s') and P(e|s, s') are the probability of the digital action and the latent representation, respectively, given the consecutive states s and s'. Further, P(a|e) represents a delta probability distribution. In particular, P(a|e) represents a function $f$ (i.e., the latent representation decoder 208) that transforms (e.g., maps) the latent representation e to a unique digital action a. Using the notation $f^{-1}(a)$ to denote all these representations that are mapped to a by the latent representation decoder 208, the assumption represented in equation 2 can also be expressed as:

$$P(a|s,s') = \int_{f^{-1}(a)} P(e|s,s') de \quad (3)$$

Using equations 2 and 3, the digital action proposal system 106 obtains the state-based digital action proposal policy 210—comprised of the state-based latent representation generation policy 204 and the latent representation decoder 208—from the Bellman equation. In particular, the digital action proposal system 106 employs a first theorem: under the assumption expressed by equations 2 and 3, the Bellman equation given by equation 1 becomes:

$$V(s) = \sum_a \int_{f^{-1}(a)} P(e|s) Q(s,a) de \quad (4)$$

By renaming P(e|s) as $\pi_i(e|s)$, the state-based digital action proposal policy 210 can be represented by the following where $\pi_i$ represents the state-based latent representation generation policy 204:

$$\pi_O(a|s) = \int_{f^{-1}(a)} \pi_i(e|s) de \quad (5)$$

As shown in equation 5, the digital action proposal system 106 determines the probability of a digital action a from the sum of the probabilities of the latent representations which are deterministically mapped to a by the latent representation decoder 208.

Figure 3:
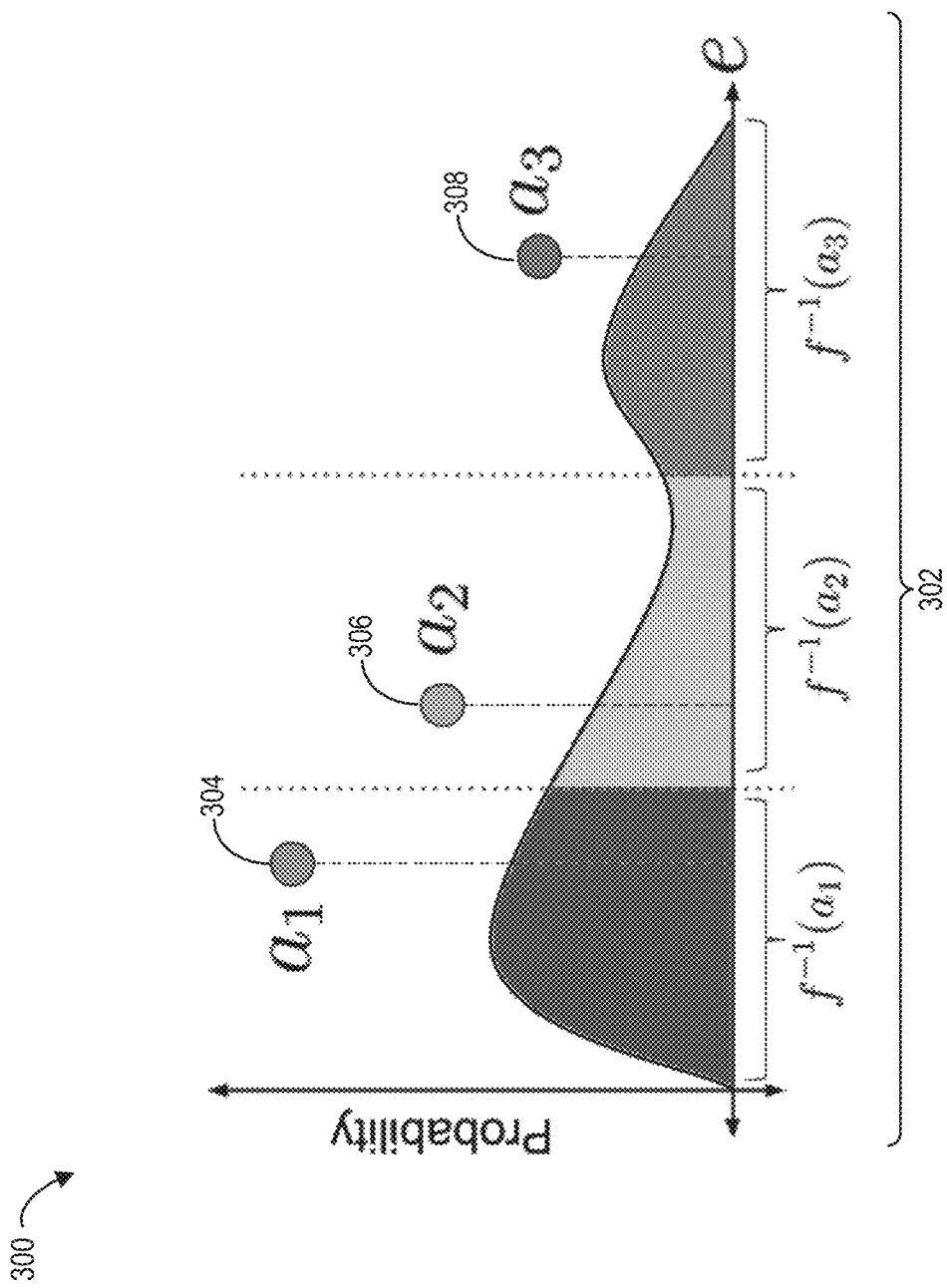
FIG. 3 illustrates a graph representing a mapping between digital actions and latent representations in accordance with one or more embodiments.

Turning now to FIG. 3, additional detail will be provided regarding the relationship between digital actions and latent representations and the probability of each digital action (as provided by equation 5). In particular, FIG. 3 illustrates a graph 300 representing a mapping between digital actions and a set of latent representations 302 in accordance with one or more embodiments. As illustrated in FIG. 3, in one or more embodiments, each latent representation e from the set of latent representations 302 includes a value within a set of continuous values (i.e., a continuous space). By contrast, each digital action—$a_1$ 304, $a_2$ 306, and $a_3$ 308—represents a discrete action from a set of discrete actions (i.e., a discrete action space). In other words, FIG. 3 shows that the set of continuous values represented by the set of latent representations 302 corresponds to the plurality of discrete actions (i.e., the digital actions 304, 306, and 308).

In one or more embodiments, the digital action proposal system 106 aligns the digital actions 304, 306, and 308 within the continuous space represented by the set of latent representations 302 based on transition correlations, allowing for faster generalization, which will be discussed in more detail below with regards to FIG. 4A. As illustrated by FIG. 3, this alignment shows that a plurality of latent representations from the set of latent representations 302 can correspond to the same digital action. In particular, in one or more embodiments, the digital action proposal system 106 maps latent representations from the set of latent representations 302 to the digital action that most closely corresponds to that latent representation (shown in the graph 300 as being the digital action closest in proximity to the latent representation). Additionally, as shown in FIG. 3, each latent representation corresponds to a probability. As mentioned above with reference to equation 5, the digital action proposal system 106 determines the probability of a digital action from the sum of the probabilities of the latent representations which are mapped to that digital action.

The digital action proposal system 106 utilizes a state-based latent representation generation policy to generate a latent representation, comprising a value from the set of continuous values represented by the set of latent representations 302. The digital action proposal system 106 then utilizes a latent representation decoder to determine which digital action from the digital actions 304, 306, 308 corresponds to the generated latent representation. The digital action proposal system 106 then proposes this digital action for execution. It should be noted that, although the graph 300 of FIG. 3 provides one representation of the relationship between latent representations and digital actions, the digital action proposal system 106 can handle any size of continuous spaces and discrete action spaces and/or any correlation between a continuous space and a discrete action space.

As mentioned above, in one or more embodiments, the digital action proposal system 106 trains the latent representation decoder and the state-based latent representation generation policy using multiple models. FIGS. 4A-4B illustrate block diagrams of training the latent representation decoder and the state-based latent representation generation policy, respectively, in accordance with one or more embodiments. In particular, FIG. 4A illustrates a block diagram of utilizing a supervised machine learning model to train a latent representation decoder to determine proposed digital actions in accordance with one or more embodiments.

Figure 4A:
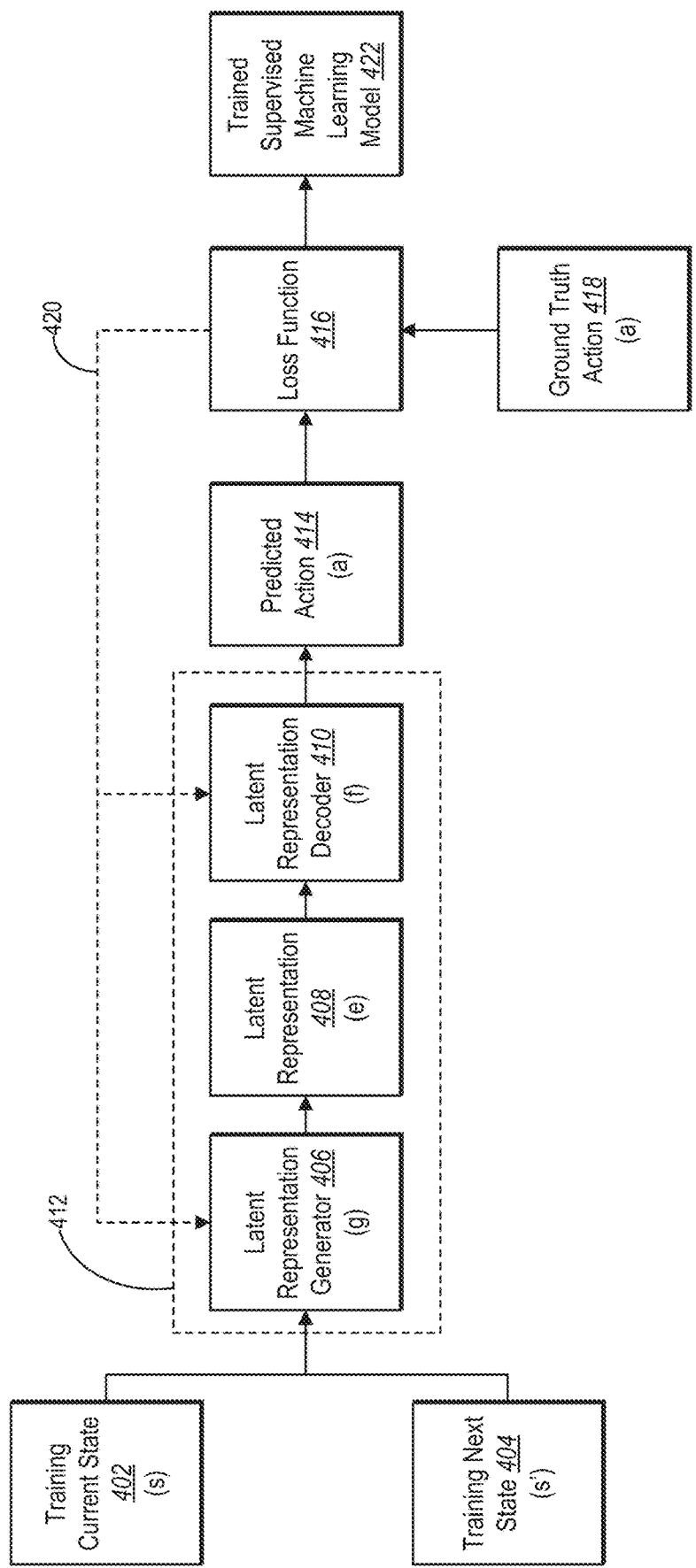
FIG. 4A illustrates a block diagram of utilizing a supervised machine learning model to train a latent representation decoder in accordance with one or more embodiments.
Figure 4B:
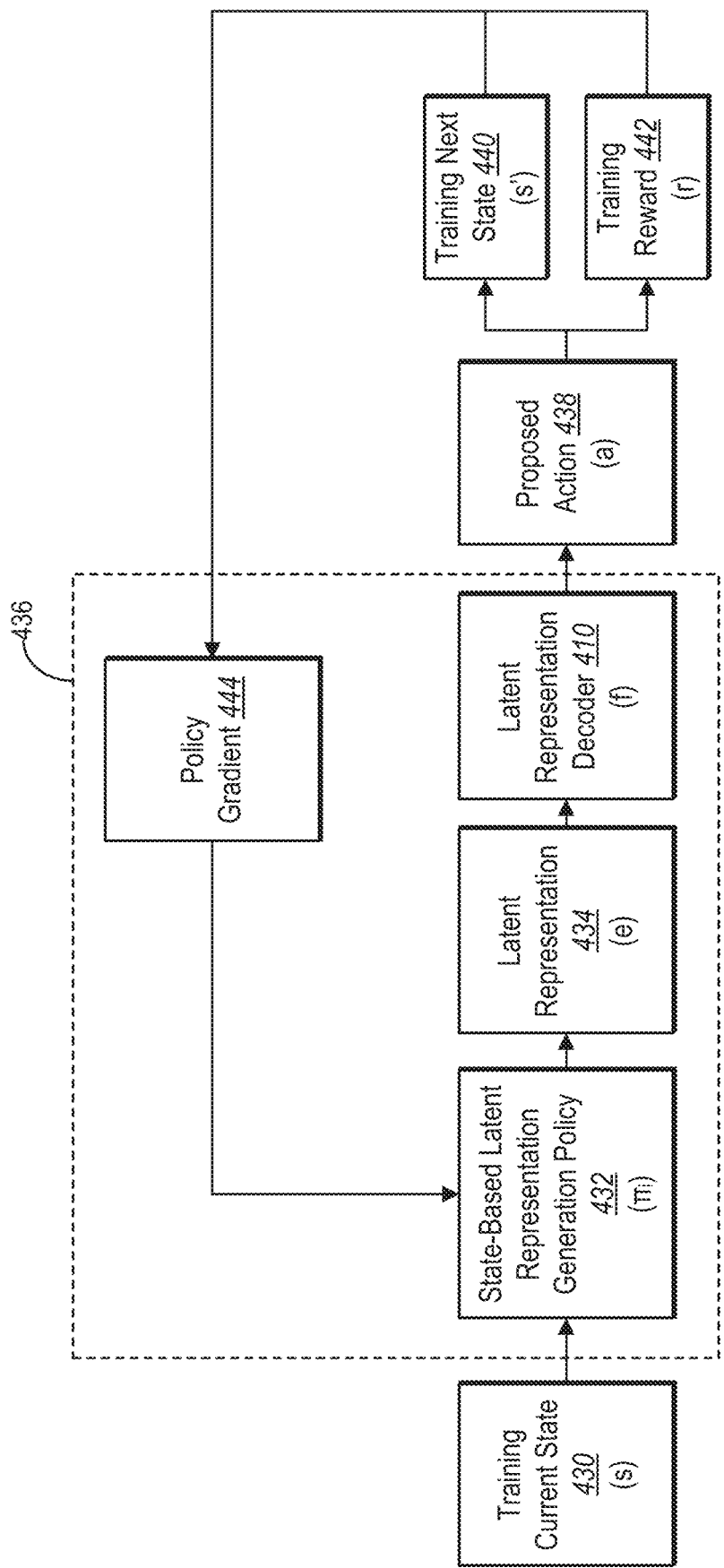
FIG. 4B illustrates a block diagram for utilizing a latent representation policy gradient model to train a state-based latent representation generation policy in accordance with one or more embodiments.

As shown in FIG. 4A, the digital action proposal system 106 utilizes a supervised machine learning model 412 to generate a predicted action 414 from a training current state 402 and a training next state 404. In particular, the supervised machine learning model 412 includes a latent representation generator 406 that generates a latent representation 408 based on the training current state 402 and the training next state 404. In one or more embodiments, the training current state 402 and the training next state 404 include the states of one or more client device that have interacted with the environment in the past. The supervised machine learning model 412 also includes a latent representation decoder 410 that analyzes the latent representation 408 to determine the predicted action 414.

The digital action proposal system 106 then provides the predicted action 414 to the loss function 416. The loss function 416 determines the loss (i.e., error) resulting from the supervised machine learning model 412 based on the difference between an estimated value (i.e., the predicted action 414) and the ground truth action 418. In particular, the loss function 416 compares the predicted action 414 to the ground truth action 418 to determine the loss. In one or more embodiments, the ground truth action 418 includes a digital action performed by one or more client devices in past interactions with the environment to transition from the training current state 402 to the training next state 404.

In one or more embodiments, the digital action proposal system 106 back propagates the loss to the supervised machine learning model 412 (as indicated by the dashed line 420) to modify its parameters. In particular, the digital action proposal system can modify the internal parameters of the latent representation generator 406 and the latent representation decoder 410. Thus, the digital action proposal system 106 trains the supervised machine learning model 412 by training each of its individual components. Consequently, with each iteration of training, the digital action proposal system 106 gradually increases the accuracy of the supervised machine learning model 412 (e.g., through gradient assent or gradient descent), including the latent representation generator 406 and the latent representation decoder 410. It should be noted that, as seen in FIG. 2, the state-based digital action proposal policy 210 need not utilize the latent representation generator 406 in generating the proposed digital action 212. In other words, in one or more embodiments, the digital action proposal system 106 only uses the latent representation generator 406 to assist in training the latent representation decoder 410.

As shown in FIG. 4A, the digital action proposal system 106 can thus generate the trained supervised machine learning model 422. More detail regarding the analysis used in training the supervised machine learning model 412, including the loss function 416, will now be provided.

As mentioned above, the digital action proposal system 106 determines equation 2 accepting that, for any consecutive states, s and s', there exists a latent representation e that can be used to infer the digital action a, which could have resulted in this transition by interaction with the corresponding environment. Accordingly, the digital action proposal system 106 determines the following where the term P(a|e) represents the latent representation decoder 410 (i.e., represented elsewhere as the function $f$):

$$P(a|s,s')=\int_e P(a|e)P(e|s,s')de \qquad (6)$$

The terms P(a|e) and P(e|s, s') are unknown a priori. Consequently, the digital action proposal system 106 parameterizes P(a|e) and P(e|s, s') using the learnable functions $f(e)$ (i.e., the latent representation decoder 410) and g(s, s') (i.e., the latent representation generator 406) respectively.

As shown in equation 6, computing the exact value of P(a|s, s') involves the complete integral over e. Due to the absence of any closed form solution, the digital action proposal system 106 utilizes a stochastic estimate of the term. To avoid expensive computation, the digital action proposal system 106 approximates equation 6 by mean-marginalizing the equation to $\overline{P}$ using the value of the mean from g(s, s'), thus determining the following:

$$\overline{P}(a|s,s')=P(a|g(s,s')) \quad (7)$$

To parameterize $f(e)$, the digital action proposal system 106 defines the parameter $W \in \mathbb{R}^{d_e \times |A|}$ such that each column of the matrix is a latent representation. The probability P(a|e) of any digital action a is then defined based upon how similar e is to a's representation. In particular, the digital action proposal system 106 considers a similarity score z, such that:

$$z_a = f(g(s,s')) = W_a^T g(s,s') \quad (8)$$

The digital action proposal system 106 then computes the estimated probability of the action using the Boltzmann distribution over the score of z as follows:

$$P(a \mid g(s, s')) = \frac{e^{z_a/\tau}}{\sum_{a'} e^{z_{a'}/\tau}} \quad (9)$$

In equation 9, $\tau$ represents the temperature variable and when $\tau \to 0$ the conditional distribution over actions becomes the required function $f$. In other words, the entire probability mass would be on the digital action a, which has the most similar representation to the latent representation e. In one or more embodiments, to ensure empirical stability during training, the digital action proposal system relaxes $\tau$ to 1.

Further, to ensure that $\overline{P}(a|s, s')$ is a close approximation to the true distribution P(a|s, s'), the digital action proposal system 106 minimizes the distance between them (i.e., the error). In one or more embodiments, the digital action proposal system 106 utilizes the Kullback-Leibler (KL) divergence to measure the distance. Because the observed trajectories contain the transitions obeying the distribution P(a|s, s'), the digital action proposal system 106 can determine the stochastic estimate of $D_{KL}(P||\overline{P})$ using the following:

$$\mathcal{L} = -\mathbb{E}_{\mathcal{A}}[\log \overline{P}(a|s,s')|s,s'] \quad (10)$$

In one or more embodiments, equation 10 represents the loss function 416. In some embodiments, the digital action proposal system 106 ignores the second term of KL, as it is independent of the parameters being optimized. The digital action proposal system 106 can minimize the loss provided by equation 10 using a gradient-based update rule to learn $f$ and g. When the loss is reduced to zero, then equations 2 and 3 are perfectly satisfied. However, perfect satisfaction is not always possible; therefore, in one or more embodiments, the digital action proposal system 106 aims for local optima.

As mentioned above with reference to FIG. 3, the digital action proposal system 106 aligns the discrete digital actions in the continuous space containing the latent representations based on transition correlations. This provides advantages over conventional systems, which typically treat each digital action as a discrete one-hot quantity. Because the digital action proposal system 106 incorporates correlations between digital actions, the digital action proposal system 106 can use information obtained after execution of one digital action to obtain information regarding other digital actions embedded in proximity to the executed digital action, even though those other digital actions were not executed. Accordingly, the digital action proposal system 106 can more efficiently generalize the decision over actions in every state of the MDP.

Additionally, with this alignment and generalization in the action space, the digital action proposal system 106 can train the state-base latent representation generator to learn only a fraction of the parameters even for large actions spaces. Accordingly, by training the latent representation decoder 410 to determine digital actions from latent representations, the digital action proposal system 106 reduces the amount of training required for the state-based latent representation generator, and therefore reduces the variance introduced during the training process. Consequently, the digital action proposal system 106 can achieve a much more accurate performance in less time when compared to conventional systems.

FIG. 4B illustrates a block diagram of utilizing a latent representation policy gradient model to train a state-based latent representation generation policy to generate latent representations in accordance with one or more embodiments. As shown in FIG. 4B, the digital action proposal system 106 utilizes a latent representation policy gradient model 436 to generate a proposed action 438 from a training current state 430. In particular, the latent representation policy gradient model 436 includes a state-based latent representation generation policy 432 that generates a latent representation 434 based on the training current state 430. The latent representation policy gradient model 436 further includes a latent representation decoder 410 that analyzes the latent representation 434 to determine the proposed action 438. It should be noted that the latent representation policy gradient model 436 includes the same latent representation decoder 410 trained by the supervised machine learning model 412 of FIG. 4A.

Upon execution of the proposed action 438 (e.g., by the digital action proposal system 106, by a client device, or by a user of a client device), the digital action proposal system 106 observes a training next state 440 and a training reward 442. The digital action proposal system 106 then modifies the state-based latent representation generation policy 432 using the policy gradient 444 based on the training next state 440 and the training reward 442. In one or more embodiments, modifying the state-based latent representation generation policy 432 includes modifying internal parameters of the state-based latent representation generation policy 432.

In one or more embodiments, the digital action proposal system 106 can train the state-based latent representation generation policy 432 on the fly. In other words, the digital action proposal system 106 can utilize the state-based digital action proposal policy to generate a proposed digital action (i.e., the proposed action 438) for a client device and then update the state-based latent representation generation policy 432 based on execution of the proposed digital action. In particular, the training current state 430 can include the current state of the client device and the training next state 440 can include a next state to which the client device transitions after execution of the proposed action 438. Similarly, the training reward 442 can include the reward resulting from execution of the action (i.e., feedback from the client device). For example, where the proposed action 438 includes digital content distributed to the client device, the reward (i.e., the training reward) can include whether or not the digital content was interacted with (e.g., clicked on or viewed), the length of user interaction (e.g., time the digital content was viewed), whether distributing the digital content led to some desired outcome, etc.

In one or more embodiments, the digital action proposal system 106 can train the latent representation policy gradient model 436, at least to some degree, in parallel with the supervised machine learning model 412 of FIG. 4A. For example, in some embodiments, the digital action proposal system 106 utilizes the latent representation policy gradient model 436 to generate the proposed action 438 based on the training current state 430, the execution of which leads to the training next state 440. The digital action proposal system 106 can then utilize the supervised machine learning model 412 to generate the predicted action 414 based on the training current state 430 and the training next state 440 (i.e., utilize the training current state 430 and the training next state 440 as the training current state 402 and the training next state 404 discussed with reference to FIG. 4A, respectively). The digital action proposal system 106 can then utilize the proposed action 438 as the ground truth action 418 of FIG. 4A in determining the loss of the supervised machine learning model 412. More detail regarding this method of training will be discussed below with regards to FIG. 5.

Additional detail regarding the analysis used in training the latent representation policy gradient model 436, including the policy gradient 444, will now be provided. In one or more embodiments, the digital action proposal system 106 can learn a policy by optimizing for its performance function shown below:

$$J = \Sigma_s d_0(s) V^\pi(s) \quad (11)$$

In equation 11, $d_0(s)$ is the initial state distribution and $V^\pi(s)$ is the value function for the policy to be learned. For a policy parameterized with weights θ, the digital action proposal system 106 can improve the total performance of a policy by ascending the policy gradient of its performance function. The policy gradient is given below:

$$\nabla J := \frac{\partial J}{\partial \theta} \quad (12)$$

To learn the state-based latent representation generation policy 432, the digital action proposal system 106 defines the performance function as:

$$J_i = \Sigma_s d_0(s) V^{\pi i}(s) \quad (13)$$

Under the policy gradient theorem, the digital action proposal system 106 determines the gradient of equation 13 using the following where the expectation is over the initial state distribution:

$$\nabla J_i = \mathbb{E}_s \left[ \int_e \pi_i(e|s) \frac{\partial}{\partial \theta} \ln(\pi_i(e|s)) \cdot Q(s,e) de \right] \quad (14)$$

In one or more embodiments, the digital action proposal system 106 learns the state-based latent representation generation policy 432 by iteratively updating its parameters in the direction of $\nabla J_i$. Because there are no special constraints on the state-based latent representation generation policy 432, the digital action proposal system 106 can utilize any variant of the policy gradient algorithm designed for continuous control (e.g., deterministic policy gradient, proximal policy optimization, etc.).

Similar to the performance function for the state-based latent representation generation policy 432 defined in equation 13, the digital action proposal system 106 defines the performance function of the state-based digital action proposal policy as:

$$J_O = \Sigma_s d_0(s) V^{\pi O}(s) \quad (15)$$

The digital action proposal system 106 ultimately trains the state-based latent representation generation policy 432 to improve the state-based digital action proposal policy. Accordingly, the digital action proposal system 106 employs a second theorem: the digital action proposal system 106 can update the state-based latent representation generation policy 432 based on updates to the state-based digital action proposal policy as shown below:

$$\nabla J_O = \nabla J_i \quad (16)$$

Thus, the digital action proposal system 106 can directly utilize $\nabla J_i$ to update the parameters of the state-based latent representation generation policy 432 while still optimizing the overall performance $\nabla J_O$.

In one or more embodiments, the training of the latent representation decoder and the state-based latent representation generator can be described in terms of an algorithm. FIG. 5 illustrates a table including an algorithm for training a latent representation decoder and a state-based latent representation generator in accordance with one or more embodiments. In particular, FIG. 5 illustrates the Policy Gradients with Representations for Actions (PG-RA) algorithm.

As shown by FIG. 5, the digital action proposal system 106 utilizes a variable k as input to determine the frequency with which the action representations (i.e., the latent representations) are updated. The set of lines 502 illustrate the update procedure for the state-based latent representation generation policy. Each time step in the episode represented by the set of lines 502 is represented by t. At each step, the digital action proposal system 106 samples an action representation and then maps the sampled action representation to the closest digital action using the latent representation decoder. Upon execution of the digital action, the digital action proposal system 106 utilizes the observed reward to update the state-based latent representation generation policy using any policy gradient algorithm. The digital action proposal system 106 further updates the critic where needed. The digital action proposal system 106 then adds the observed transition to a memory buffer so that it can be used for self-supervision later.

The set of lines 504 illustrate the process for self-supervision. In particular, the digital action proposal system 106 samples a batch of transitions from the memory buffer n and uses the sampled batch to estimate the probability of the digital action associated with those transitions. The digital action proposal system 106 then utilizes the ground truth action to update the parameters of the latent representation generator and the latent representation decoder by minimizing the loss. The digital action proposal system 106 minimizes the loss until the improvement becomes unnoticeable (e.g., the improvement falls below some improvement threshold). The inner loop represented by the set of lines 504 keeps the update sequence for action representations faster to allow for quick convergence. In one or more embodiments, the digital action proposal system 106 collects random trajectories in the beginning and performs self-supervision only once.

Thus, the digital action proposal system 106 can train a supervised machine learning model comprising a latent representation decoder to generate proposed digital actions. The algorithms and acts described with reference to FIGS. 4A and/or 5 can comprise the corresponding structure for performing a step for training a supervised machine learning model comprising a latent representation decoder to generate proposed digital actions.

Additionally, the digital action proposal system 106 can train a state-based latent representation generation policy to generate latent representations from input states. The algorithms and acts described with reference to FIGS. 4B and/or 5 can comprise the corresponding structure for performing a step for training a state-based latent representation generation policy, utilizing a latent representation policy gradient model, to generate latent representations from input states.

Figure 6A:
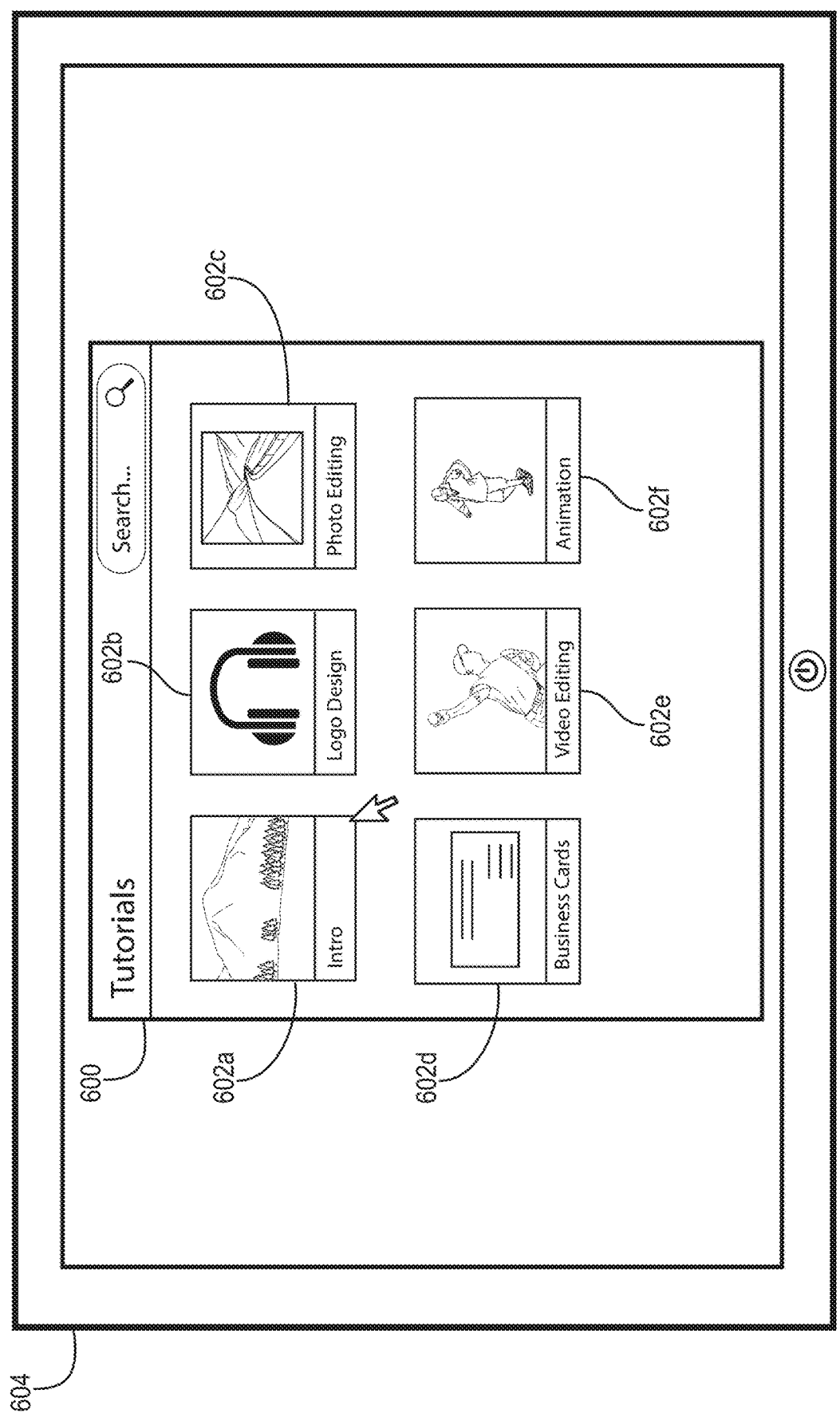
FIGS. 6A-6C illustrate a user interface through which the digital action proposal system can provide proposed digital actions in accordance with one or more embodiments.
Figure 6B:
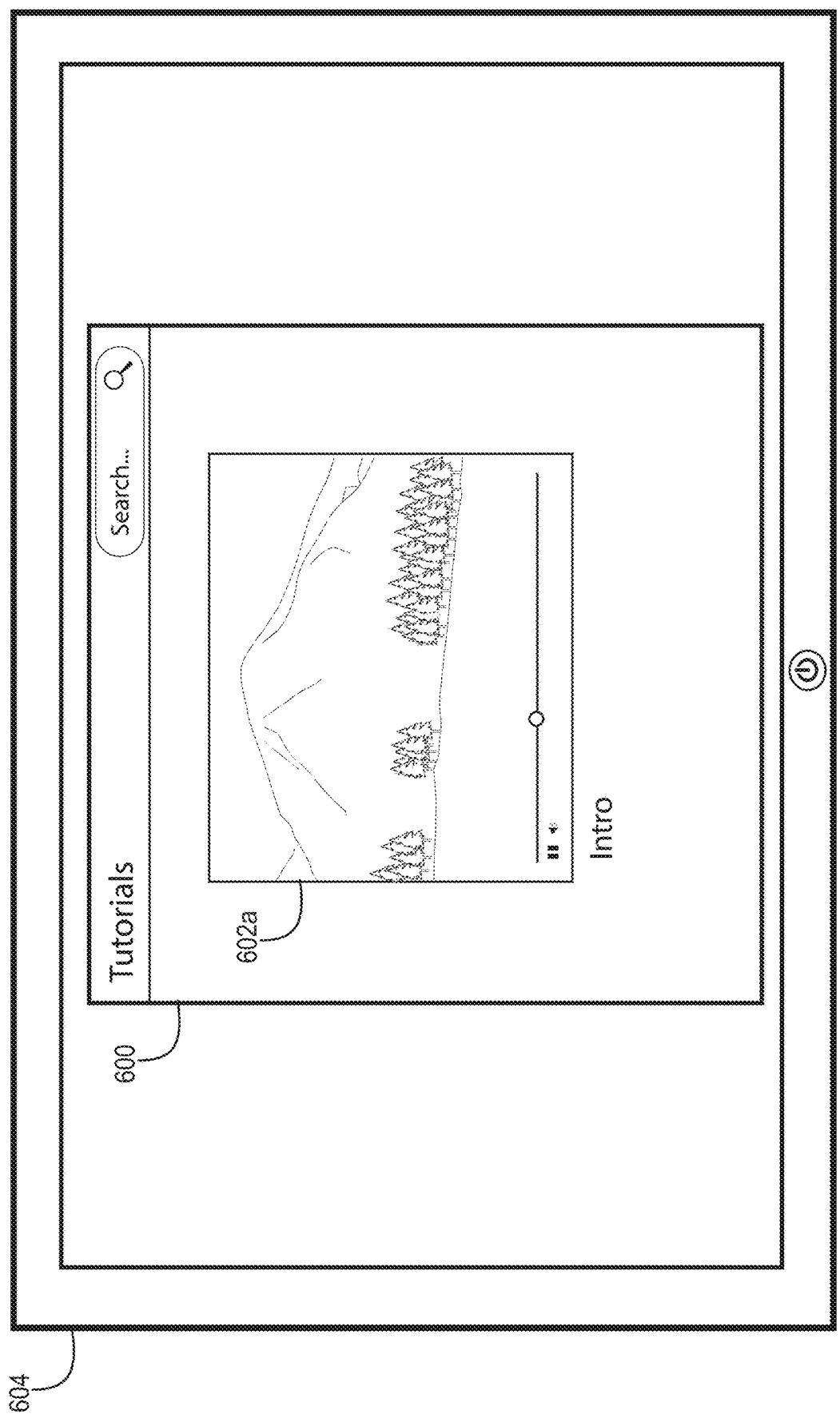
Figure 6C:
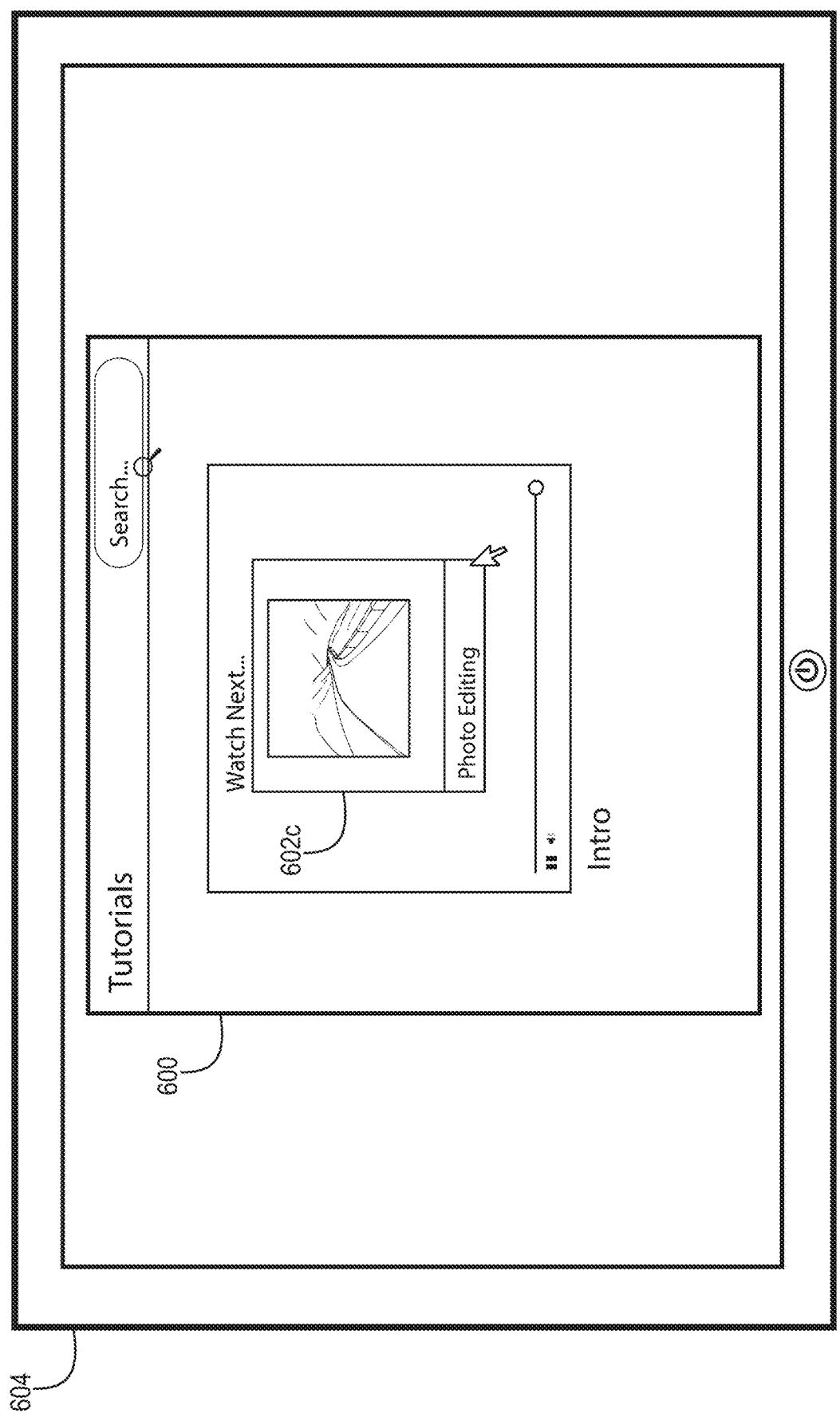

The digital action proposal system 106 can generate proposed digital actions for many different types of decision-making problems. FIGS. 6A-6C illustrate a user interface with which the digital action proposal system 106 can utilize to generate and provide proposed digital actions in accordance with one or more embodiments. In particular, FIGS. 6A-6C illustrate the digital action proposal system 106 proposing tutorial videos for a user to watch using a client device.

FIG. 6A illustrates the user interface 600 displaying tutorial videos 602a-602f for viewing on a client device 604. In particular, in one or more embodiments, the tutorial videos 602a-602f are provided by a third-party service (e.g., a service hosted on the third-party network server 110 of FIG. 1) and the digital action proposal system 106 communicates with the third-party service in generating and providing proposed digital actions. As shown in FIG. 6A, in one or more embodiments, a user of the client device 604 can select one of the tutorial videos 602a-602f as a first tutorial video for viewing. In some embodiments, however, the digital action proposal system 106 proposes a first tutorial video as a first proposed digital action through the user interface 600. For example, the digital action proposal system 106 can determine an initial state of the client device 604 (e.g., from an initial distribution of states) and generate a first proposed video accordingly. FIG. 6B illustrates the user interface 600 displaying the tutorial video 602a. FIG. 6C illustrates the digital action proposal system 106 providing a proposed digital action through the user interface 600 after the tutorial video 602a has completed. In particular, the digital action proposal system 106 proposes that the user watch the tutorial video 602c.

Though FIGS. 6A-6C illustrates the digital action proposal system 106 proposing videos for a user to watch, the digital action proposal system 106 can generate and provide proposed digital actions for any type of system. For example, the digital action proposal system 106 can be applied to for advertising, personalized recommendations, inventory management, power system control, etc.

Thus, the digital action proposal system 106 can utilize a state-based latent representation generation policy and a latent representation decoder to generate proposed digital actions for a client device. The algorithms and acts described with reference to FIGS. 1-2 can comprise the corresponding structure for performing a step for generating a proposed digital action from the plurality of available actions and the current state utilizing the state-based latent representation generation policy and the latent representation decoder.

As mentioned above, utilizing a latent representation generator trained using a supervised machine learning model in combination with a state-based latent representation generation policy trained using a latent representation policy gradient model allows the digital action proposal system 106 to more accurately generate proposed digital actions, especially in environments with large action spaces. Researchers have conducted several studies to determine the accuracy of one or more embodiments of the digital action proposal system 106. The researchers compared the performance of the Actor-Critic (AC) policy gradient method with the performance of variants of the PG-RA algorithm that use the AC and DPG policy gradient methods (labeled as AC-RA and DPG-RA, respectively) utilized by the digital action proposal system 106 in one or more embodiments. The researchers measured the performance of each tested method using the total expected return provided by the proposed digital actions.

Figure 7B:
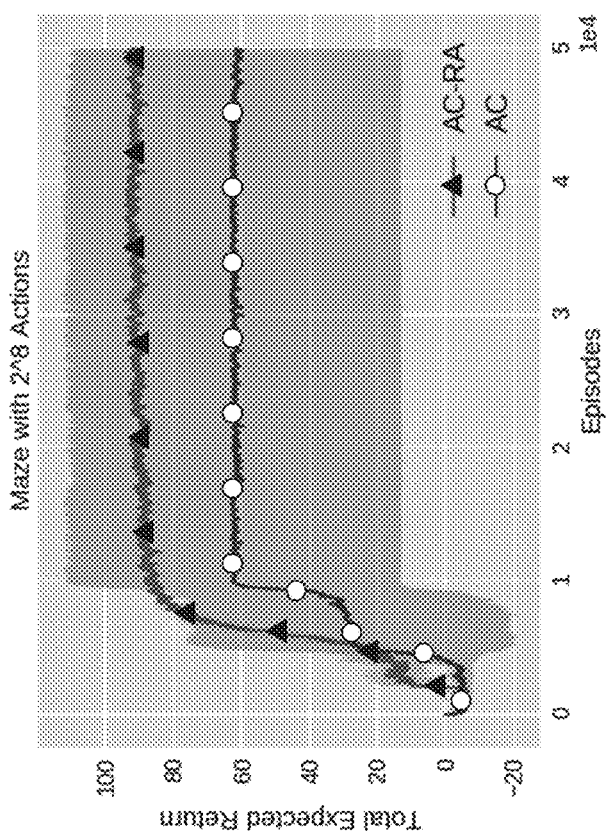
FIGS. 7A-7C each illustrate a graph reflecting experimental results regarding the effectiveness of the digital action proposal system in accordance with one or more embodiments.
Figure 7A:
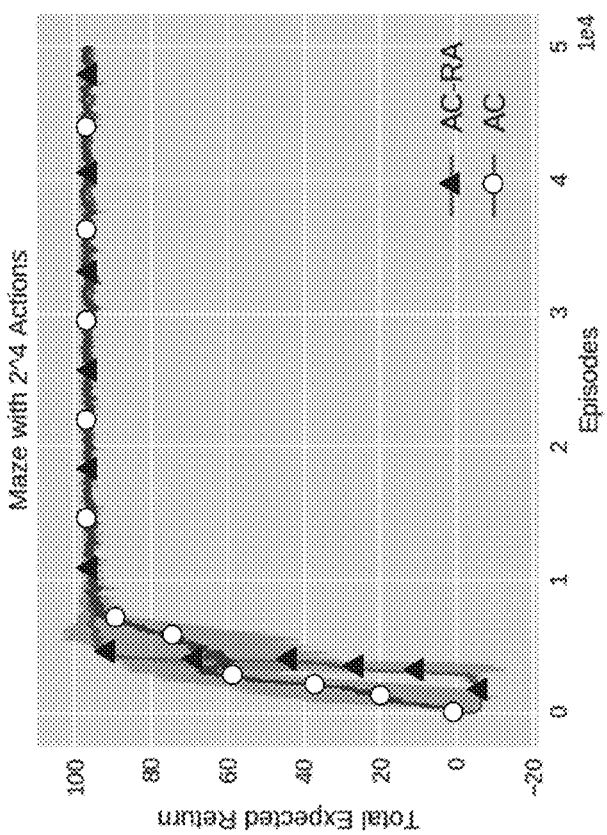
Figure 7C:
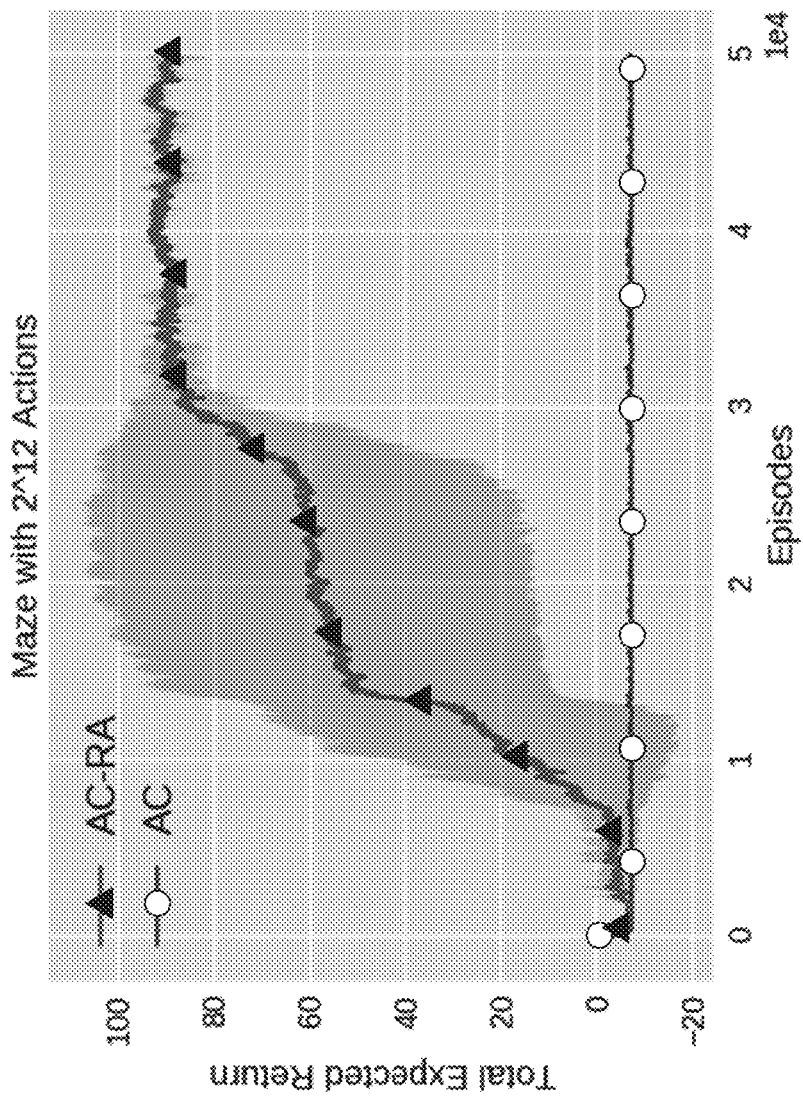

FIGS. 7A-7C each illustrate a graph plotting the expected return provided by both the AC policy gradient method and the AC-RA method (implemented by the digital action proposal system 106) in a virtual maze environment. In particular, the virtual maze included a continuous-state environment where the state comprised the coordinates of the agent's (e.g., client device) current location. The agent was rewarded a small penalty for each time step and a reward of 100 on reaching the goal position. The maximum episode length was set to 150 time steps. The graphs of FIG. 7A-7C further include the variance associated with each tested method.

FIG. 7A illustrates the results for a simulation that included $2^4$ actions. FIG. 7B illustrates the results for a simulation that included $2^8$ actions. FIG. 7C illustrates the results for a simulation that included $2^{16}$ actions. Considered together, FIGS. 7A-7C show how the performance of the AC policy gradient method deteriorates as the number of actions increases, even though the goal remains the same. By comparison, the digital action proposal system 106 more accurately proposes digital actions that will yield high long-term rewards.

Figure 8B:
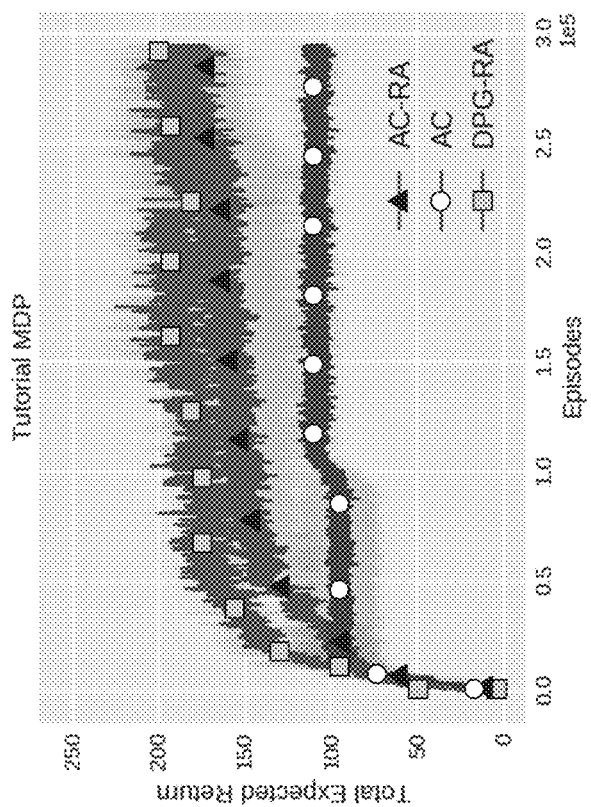
FIGS. 8A-8B each illustrate a graph reflecting additional experimental results regarding the effectiveness of the digital action proposal system in accordance with one or more embodiments.
Figure 8A:
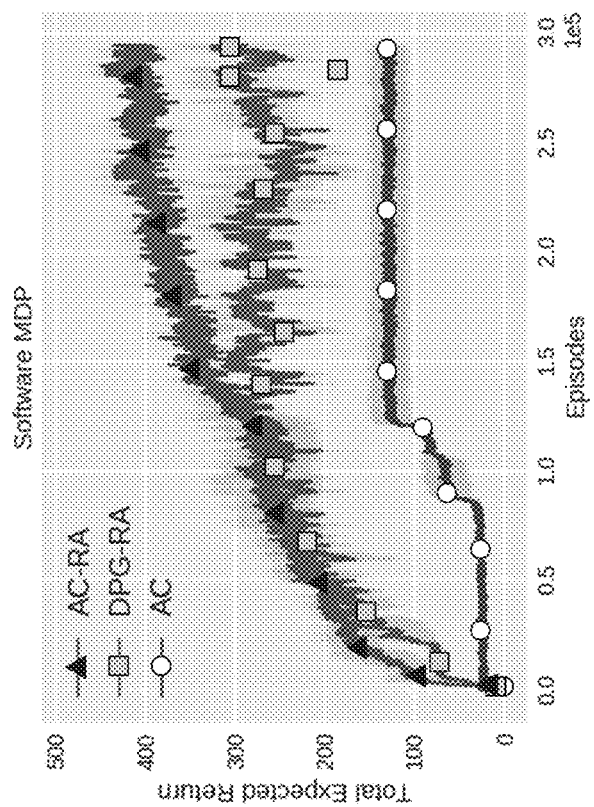

FIG. 8A-8B each illustrate a graph plotting the expected return provided by the AC policy gradient method and AC-RA and DPG-RA methods (implemented by the digital action proposal system 106) in a real-world environment as well as the variance associated with each tested method. In particular, FIG. 8A illustrates implementation of each method in conjunction with a web-based video-tutorial platform in which the aim of each method was to meaningfully engage the users in a learning activity. The total number of tutorials considered for recommendation was 1498. FIG. 8B illustrates implementation of each method in conjunction with professional creativity software where the aim of each method was to recommend a sequence of tools to increase the user's productivity and assist them in quickly achieving their end goal. Each method made a recommendation from among 1843 possible tools at each time step. For each environment, rewards were chosen based on a surrogate measure for difficulty level of tutorials and popularity of final outcomes of users on the software, respectively.

As shown in FIG. 8A-8B, the standard AC policy gradient method fails to reason over longer time horizons with so many actions and learning becomes stuck, choosing mostly one-step actions that have high returns. In comparison, the digital action proposal system 106—implementing the AC-RA and DPG-RA methods—improves generalization through the use of the latent representations. In many instances, the digital action proposal system 106 improves performance by as much as a factor of four.

In one or more embodiments, the digital action proposal system 106 provides the improvements described above based on the accuracy of the first theorem described above (i.e., redefining the Bellman equation—initially provided in equation 1—as provided in equation 4 above). More detail regarding the first theorem will now be provided below. In particular, the first theorem can be shown to be true using the following proof, thus showing that the digital action proposal system 106 can indeed generate proposed digital actions that more accurately provide optimal rewards long-term. Starting with equation 1, the Bellman equation can be written as the following:

$$V(s) = \Sigma_a \pi(a|s) Q(s,a) = \Sigma_a \pi(a|s) \Sigma_{s'} P(s'|s,a)[r + \gamma V(s')] \quad (17)$$

Using $R = [r + \gamma V(s')]$ for purposes of brevity, the digital action proposal system 106 can rearrange equation 17 to become:

$$V(s) = \sum_a \sum_{s'} \pi(a|s) \frac{P(s', s, a)}{P(s, a)} R \quad (18)$$
$$= \sum_a \sum_{s'} \pi(a|s) \frac{P(s', s, a)}{\pi(a|s) P(s)} R$$
$$= \sum_a \sum_{s'} \frac{P(s', s, a)}{P(s)} R$$
$$= \sum_a \sum_{s'} \frac{P(a|s, s') P(s, s')}{P(s)} R$$

Using the law of total probability, the digital action proposal system 106 introduces the variable e first introduced with reference to equation 2. Equation 18 becomes:

$$V(s) = \sum_a \sum_{s'} \int_e \frac{P(a, e|s, s') P(s, s')}{P(s)} R \, de \quad (19)$$

The digital action proposal system 106 then multiplies and divides equation 19 with the term P(e|s) to obtain:

$$V(s) = \sum_a \sum_{s'} \int_e P(e|s) \frac{P(a, e|s, s') P(s, s')}{P(e|s) P(s)} R \, de \quad (20)$$
$$= \sum_a \int_e P(e|s) \sum_{s'} \frac{P(a, e|s, s') P(s, s')}{P(s, e)} R \, de$$

The digital action proposal system 106 further simplifies equation 20 to become:

$$V(s) = \sum_a \int_e P(e|s) \sum_{s'} P(s', a|s, e) R \, de \quad (21)$$
$$= \sum_a \int_e P(e|s) \sum_{s'} P(s'|s, a, e) P(a|s, e) R \, de$$

Because transition to s' in the environment is only dependent upon the previous state and action, equation 21 becomes:

$$V(s) = \Sigma_a \int_e P(e|s) \Sigma_{s'} P(s'|s,a) P(a|s,e) R \, de \quad (22)$$

Based on the assumption that results in equations 2 and 3—that the digital action a is conditionally independent of others given e—equation 22 can be expressed as:

$$V(s) = \Sigma_a \int_e P(e|s) \Sigma_{s'} P(s'|s,a) P(a|e) R \, de \quad (23)$$

Because P(a|e) evaluates to 1 for representations that map to a and 0 for others, equation 23 can be rewritten as follows using the state action value function (i.e., $Q(s, a) = \mathbb{E}[\Sigma_{t=0}^{\infty} \gamma^t r_t | s, a, \pi, \mathcal{M}]$):

$$V(s) = \sum_a \int_{f^{-1}(a)} P(e|s) \sum_{s'} P(s'|s, a) R \, de \quad (24)$$
$$= \sum_a \int_{f^{-1}(a)} P(e|s) Q(s, a) \, de$$

Thus, by employing the first theorem, the digital action proposal system 106 can more efficiently train models to accurately provide proposed digital actions.

Further, in one or more embodiments, the digital action proposal system 106 provides the improvements described above based on updating the state-based latent representation generation policy based on the accuracy of the second theorem described above. More detail regarding the second theorem will now be provided below. In particular, the second theorem can be shown to be true using the following proof, thus showing that the digital action proposal system 106 can indeed generate proposed digital actions that more accurately provide optimal rewards long-term. Using the first theorem, the digital action proposal system 106 can express the performance function of the state-based digital action proposal policy, provided by equation 15) as:

$$J_O = \Sigma_s d_0(s) \Sigma_a \int_{f^{-1}(a)} P(e|s) Q(s,a) de \quad (25)$$

Using the policy gradient theorem, the digital action proposal system 106 defines the biased gradient as:

$$\nabla J_O = \mathbb{E}_s \left[ \sum_a \frac{\partial}{\partial \theta} \left( \int_{f^{-1}(a)} \pi_i(e|s) \right) Q(s, a) de \right] \quad (26)$$
$$= \mathbb{E}_s \left[ \sum_a \int_{f^{-1}(a)} \frac{\partial}{\partial \theta} (\pi_i(e|s)) Q(s, a) de \right]$$

Using the score function, the digital action proposal system 106 can redefine equation 26 to become:

$$\nabla J_O = \mathbb{E}_s \left[ \sum_a \int_{f^{-1}(a)} \pi_i(e|s) \frac{\partial}{\partial \theta} \ln(\pi_i(e|s)) Q(s, a) de \right] \quad (27)$$

For the set of e that map to a, Q(s, a)=Q(s, e); therefore, equation 27 can be expressed as:

$$\nabla J_O = \mathbb{E}_s \left[ \sum_a \int_{f^{-1}(a)} \pi_i(e|s) \frac{\partial}{\partial \theta} \ln(\pi_i(e|s)) Q(s, e) de \right] \quad (28)$$

Because each e gets mapped to only a unique a by the function $f$, the digital action proposal system 106 replaces the nested summation over a and each of its inner integral over $f^{-1}(a)$ with an integral over the entire domain of e. In particular, the digital action proposal system redefines equation 28 as:

$$\nabla J_O = \mathbb{E}_s \left[ \int_e \pi_i(e \mid s) \frac{\partial}{\partial \theta} \ln(\pi_i(e \mid s)) Q(s, e) de \right] = \nabla J_i \qquad (29)$$

Thus, by employing the second theorem, the digital action proposal system 106 can more efficiently train models to accurately provide proposed digital actions.

Figure 9:
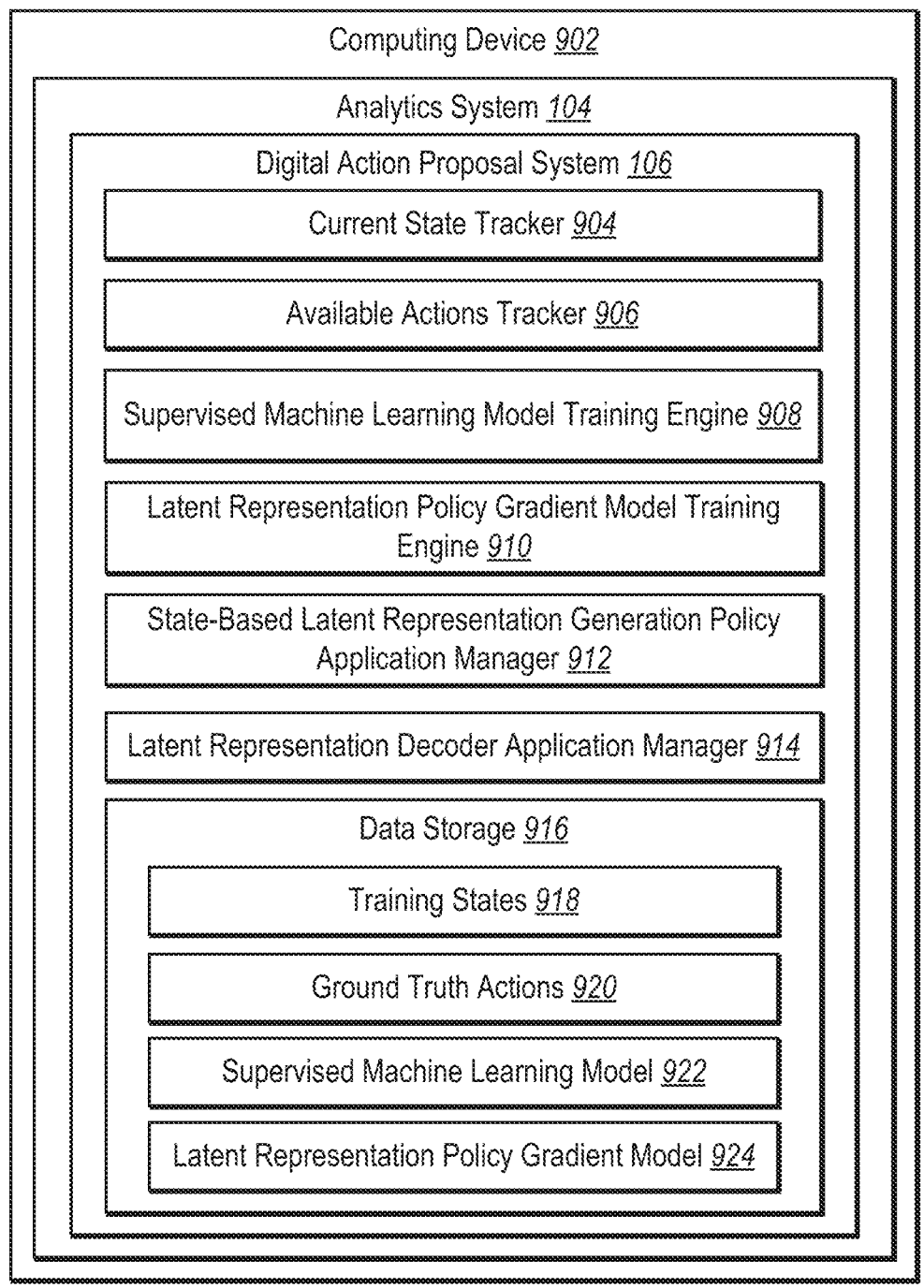
FIG. 9 illustrates an example schematic diagram of a digital action proposal system in accordance with one or more embodiments.

Turning now to FIG. 9, additional detail will now be provided regarding various components and capabilities of the digital action proposal system 106. In particular, FIG. 9 illustrates the digital action proposal system implemented by the computing device 902 (e.g., the server(s) 102 as discussed above with reference to FIG. 1). Additionally, the digital action proposal system 106 is also part of the analytics system 104. As shown, the digital action proposal system 106 can include, but is not limited to, a current state tracker 904, an available actions tracker 906, a supervised machine learning model training engine 908, a latent representation policy gradient model training engine 910, a state-based latent representation generation policy application manager 912, a latent representation decoder application manager 914, and data storage 916 (which includes the training states 918, the ground truth actions 920, the supervised machine learning model 922, and the latent representation policy gradient model 924).

As just mentioned, and as illustrated in FIG. 9, the digital action proposal system 106 includes the current state tracker 904. In particular, the current state tracker 904 tracks (e.g., identifies) the current state of a client device. For example, in one or more embodiments, the current state tracker 904 receives the current state of the client device from a third-party service with which the client device communicates or directly from the client device itself. The current state tracker 904 can provide the current state of the client device to the state-based latent representation generation policy application manager 912 to generate a latent representation.

As shown in FIG. 9, the digital action proposal system 106 can also include the available actions tracker 906. In particular, the available actions tracker 906 identifies a plurality of available actions corresponding to the client device. In one or more embodiments, the available actions tracker 906 identifies the plurality of available actions based on the current state identified by the current state tracker 904.

Additionally, as shown in FIG. 9, the digital action proposal system includes the supervised machine learning model training engine 908. In particular, the supervised machine learning model training engine 908 can train a supervised machine learning model to generate predicted actions based on a training current states and training next states (retrieved from the training states 918). In one or more embodiments, the supervised machine learning model training engine 908 trains a latent representation generator to generate latent representations based on the training current states and the training states. In further embodiments, the supervised machine learning model training engine 908 trains a latent representation decoder to determine predicted actions based on the latent representations generated by the latent representation generator.

Further, as shown in FIG. 9 the digital action proposal system 106 includes the latent representation policy gradient model training engine 910. In particular, the latent representation policy gradient model training engine 910 trains a state-based latent representation generation policy to generate latent representations from a training current state of a client device (retrieved from the training states 918). In one or more embodiments, the latent representation policy gradient model training engine 910 utilizes the latent representation decoder trained by the supervised machine learning model training engine 908 to assist in training the state-based latent representation generation policy.

As shown in FIG. 9, the digital action proposal system 106 includes the state-based latent representation generation policy application manager 912. In particular, the state-based latent representation generation policy application manager 912 uses the state-based latent representation generation policy trained by the latent representation policy gradient model training engine 910 to generate latent representations based on current states of the client devices. For example, the state-based latent representation generation policy application manager 912 can receive a current state of a client device from the current state tracker 904 and utilize the state-based latent representation generation policy to generate a latent representation based on the current state.

Additionally, as shown in FIG. 9, the digital action proposal system 106 includes the latent representation decoder application manager 914. In particular, the latent representation decoder application manager 914 uses the latent representation decoder trained by the supervised machine learning model training engine 908 to determine proposed digital actions based on latent representations. For example, the latent representation decoder application manager 914 can receive a latent representation from the state-based latent representation generation policy application manager 912 and utilize the latent representation decoder to determine a proposed digital action based on the received latent representation.

Further, as shown in FIG. 9, the digital action proposal system 106 includes data storage 916. In particular, data storage 916 includes training states 918, ground truth actions 920, supervised machine learning model 922, and latent representation policy gradient model 924. Training states 918 stores a plurality of training states used in training supervised machine learning models and latent representation policy gradient models. The supervised machine learning model training engine 908 can obtain training states (e.g., training current states and training next states) from training states 918 when training the latent representation decoder to determine proposed digital actions from latent representations. The latent representation policy gradient model training engine 910 can receive training states (e.g., training current states) from training states 918 when training the state-based latent representation generation policy to generate latent representations from the current states of client devices. Ground truth actions 920 stores ground truth actions utilized by the supervised machine learning model training engine 908 to train the latent representation decoder. Supervised machine learning model 922 stores the supervised machine learning model trained by the supervised machine learning model training engine 908, including the trained latent representation decoder utilized by the latent representation decoder application manager 914. Latent representation policy gradient model 924 stores the latent representation policy gradient model trained by the latent representation policy gradient model training engine 910, including the trained state-based latent representation generation policy utilized by the state-based latent representation generation policy application manager 912.

Each of the components 904-924 of the digital action proposal system 106 can include software, hardware, or both. For example, the components 904-924 can include one or more instructions stored on a computer-readable storage medium and executable by processors of one or more computing devices, such as a client device or server device. When executed by the one or more processors, the computer-executable instructions of the digital action proposal system 106 can cause the computing device(s) to perform the methods described herein. Alternatively, the components 904-924 can include hardware, such as a special-purpose processing device to perform a certain function or group of functions. Alternatively, the components 904-924 of the digital action proposal system 106 can include a combination of computer-executable instructions and hardware.

Furthermore, the components 904-924 of the digital action proposal system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 904-924 of the digital action proposal system 106 may be implemented as a stand-alone application, such as a desktop or mobile application. Furthermore, the components 904-924 of the digital action proposal system 106 may be implemented as one or more web-based applications hosted on a remote server. Alternatively, or additionally, the components 904-924 of the digital action proposal system 106 may be implemented in a suite of mobile device applications or "apps." For example, in one or more embodiments, the digital action proposal system 106 can comprise or operate in connection with digital software applications such as ADOBE® ANALYTICS CLOUD® or ADOBE® MARKETING CLOUD®. "ADOBE," "ANALYTICS CLOUD," and "MARKETING CLOUD" are either registered trademarks or trademarks of Adobe Inc. in the United States and/or other countries.

Figure 10:
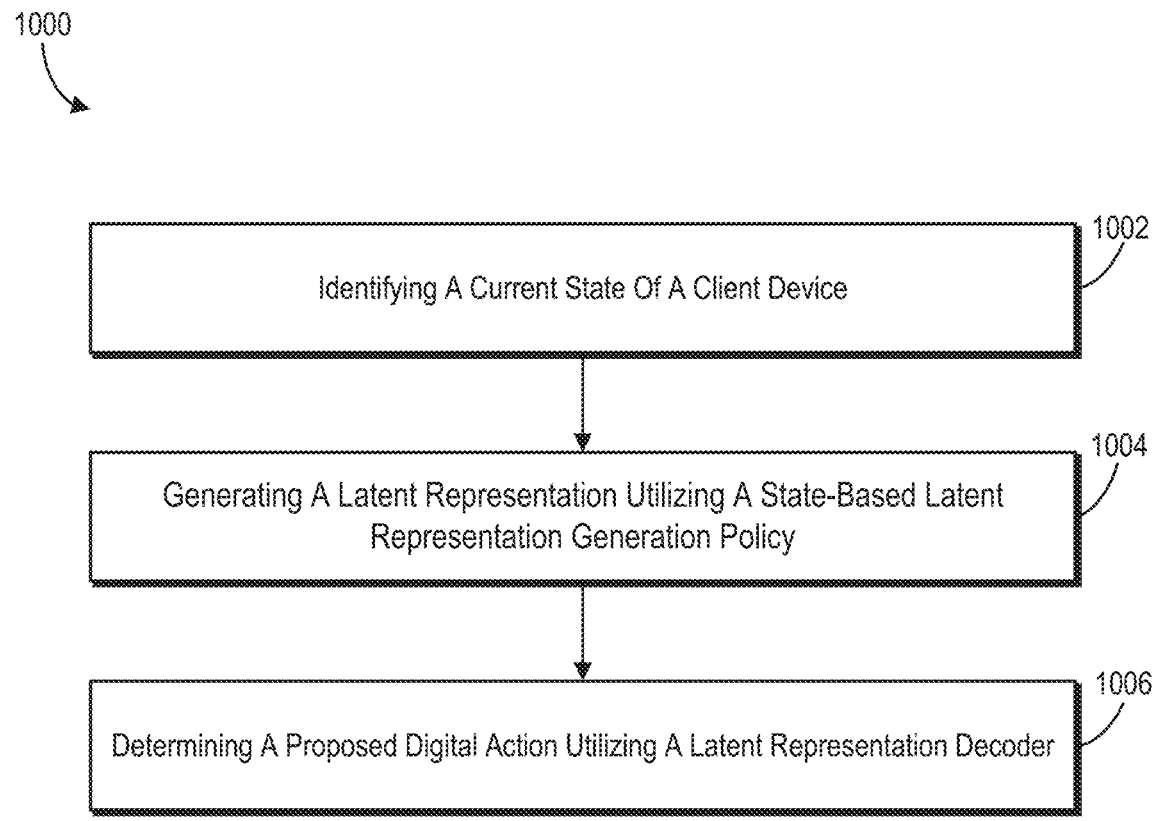
FIG. 10 illustrates a flowchart of a series of acts for generating a proposed digital action for a client device in accordance with one or more embodiments.
Figure 11:
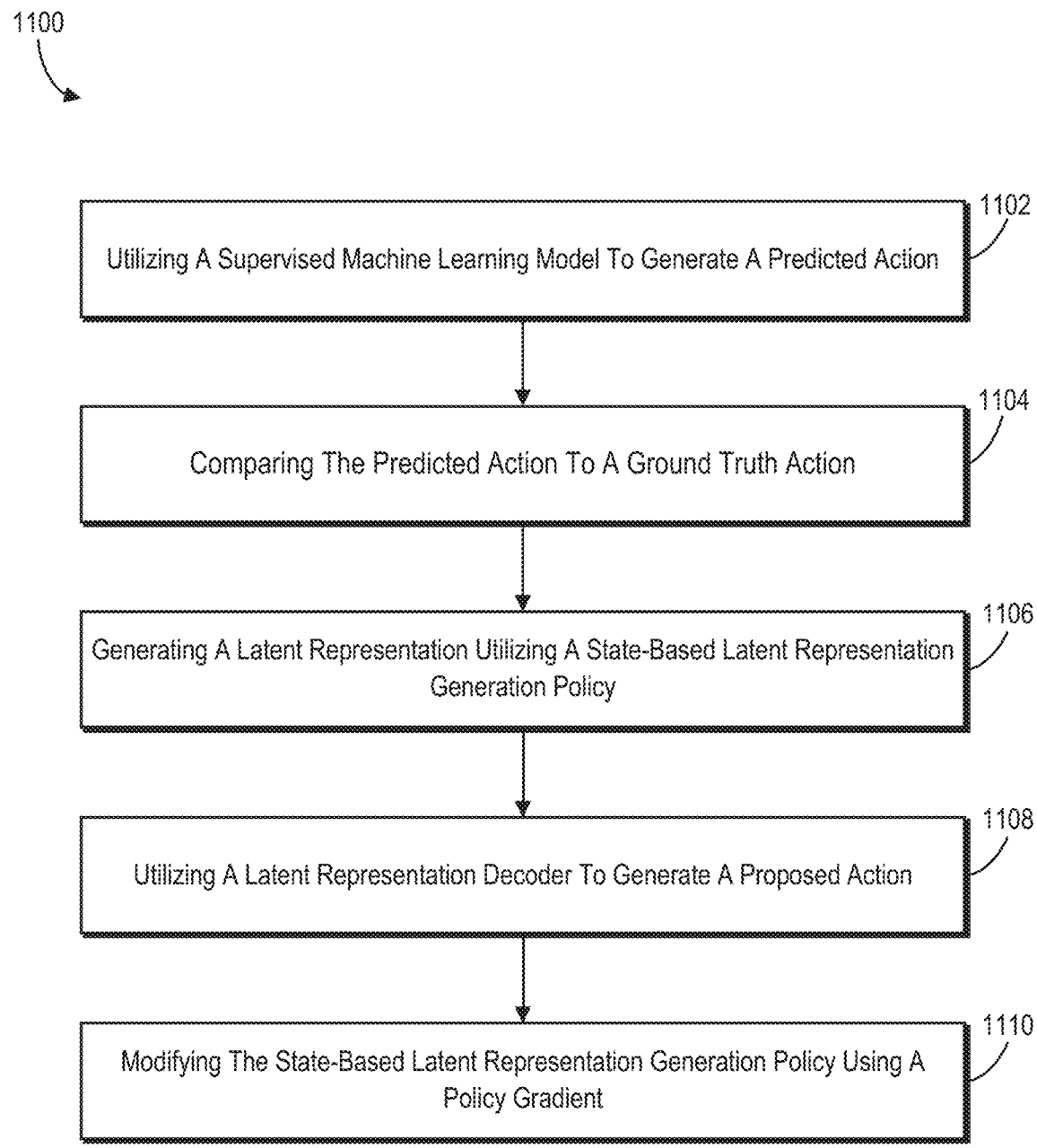
FIG. 11 illustrates a flowchart of a series of acts for training a latent representation decoder and a state-based latent representation generation policy in accordance with one or more embodiments.

FIGS. 1-9, the corresponding text, and the examples provide a number of different methods, systems, devices, and non-transitory computer-readable media of the digital action proposal system 106. In addition to the foregoing, one or more embodiments can also be described in terms of flowcharts comprising acts for accomplishing a particular result, as shown in FIGS. 10-11. FIGS. 10-11 may be performed with more or fewer acts. Further, the acts may be performed in differing orders. Additionally, the acts described herein may be repeated or performed in parallel with one another or in parallel with different instances of the same or similar acts.

As mentioned, FIG. 10 illustrates a flowchart of a series of acts 1000 for generating a proposed digital action for a client device. While FIG. 10 illustrates acts according to one embodiment, alternative embodiments may omit, add to, reorder, and/or modify any of the acts shown in FIG. 10. The acts of FIG. 10 can be performed as part of a method. For example, in some embodiments, the acts of FIG. 10 can be performed as part of a computer-implemented method for generating and providing digital action recommendations based on digital embeddings of action spaces. Alternatively, a non-transitory computer-readable medium can comprise instructions that, when executed by one or more processors, cause a computing device to perform the acts of FIG. 10. In some embodiments, a system can perform the acts of FIG. 10. For example, in one or more embodiments, a system includes at least one processor and at least one non-transitory computer readable storage medium storing instructions that, when executed by the at least one processor, cause the system to perform the acts of FIG. 10.

The series of acts 1000 includes an act 1002 of identifying a current state of a client device. For example, the act 1002 involves identify a current state of a client device and a plurality of available actions corresponding to the client device. In one or more embodiments, the current state of the client device comprises at least one of digital content previously distributed to the client device or steps previously taken with respect to a process. In some embodiments, identifying the current state of the client device comprises determining an initial state of the client device from an initial distribution of states. Additionally, in some embodiments, the plurality of available actions comprises a plurality of discrete actions.

The series of acts 1000 also includes an act 1004 of generating a latent representation utilizing a state-based latent representation generation policy. For example, the act 1004 involves generating a proposed digital action for the client device from the plurality of available actions by generating a latent representation based on the current state of the client device utilizing a state-based latent representation generation policy. In one or more embodiments, the state-based latent representation generation policy is trained using a latent representation policy gradient model, the latent representation policy gradient model comprises a latent representation decoder, and the latent representation decoder is trained using a supervised machine learning model. Additionally, in some embodiments, the latent representation comprises a value from a set of continuous values corresponding to the plurality of discrete actions.

The series of acts 1000 further includes an act 1006 of determining a proposed digital action utilizing a latent representation decoder. For example, the act 1006 involves generating a proposed digital action for the client device from the plurality of available actions by determining the proposed digital action from the plurality of available actions by analyzing the latent representation utilizing the latent representation decoder. In one or more embodiments, the proposed digital action comprises at least one of digital content to distribute or a step to take with respect to a process.

In one or more embodiments, the series of acts 1000 further includes determining a reward resulting from executing the proposed digital action and modifying the state-based latent representation generation policy based on the reward. In other words, in some embodiments, the digital action proposal system 106 can iteratively train the state-based latent representation generation policy on the fly by proposing a digital action to a client device, observing the results of execution of the digital action (i.e., the rewards and next states resulting from execution of the digital action), and modifying the state-based latent representation generation policy based on those results before proposing a subsequent digital action.

In one or more embodiments, the series of acts 1000 further includes acts for generating a second proposed digital action. For example, in one or more embodiments, the acts can include identifying a next state of the client device and a second plurality of available actions corresponding to the client device upon execution of the proposed digital action; and generating a second latent representation based on the next state of the client device utilizing the state-based latent representation generation policy. In some embodiments, the acts further include determining a second proposed digital action from the second plurality of available actions by analyzing the second latent representation utilizing the latent representation decoder.

FIG. 11 illustrates a flowchart of a series of acts 1100 for training a latent representation decoder and a state-based latent representation generation policy. While FIG. 11 illustrates acts according to one embodiment, alternative embodiments may omit, add to, reorder, and/or modify any of the acts shown in FIG. 11. The acts of FIG. 11 can be performed as part of a method. For example, in some embodiments, the acts of FIG. 11 can be performed as part of a computer-implemented method for generating and providing digital action recommendations based on digital embeddings of action spaces. Alternatively, a non-transitory computer-readable medium can comprise instructions that, when executed by one or more processors, cause a computing device to perform the acts of FIG. 11. In some embodiments, a system can perform the acts of FIG. 11. For example, in one or more embodiments, a system includes at least one processor and at least one non-transitory computer readable storage medium storing instructions that, when executed by the at least one processor, cause the system to perform the acts of FIG. 11.

The series of acts 1100 includes the act 1102 of utilizing a supervised machine learning model to generate a predicted action. For example, the act 1102 involves training a supervised machine learning model comprising a latent representation decoder to generate actions by utilizing the supervised machine learning model to generate a predicted action from a first training current state and a first training next state.

In one or more embodiments, the supervised machine learning model comprises a latent representation generator and the latent representation decoder. Accordingly, utilizing the supervised machine learning model to generate the predicted action from the first training current state and the first training next state can include utilizing the latent representation generator to generate a second latent representation based on the first training current state and the first training next state; and determining the predicted action by analyzing the second latent representation utilizing the latent representation decoder. In one or more embodiments, the latent representation generator comprises a neural network.

Additionally, the series of acts 1100 includes the act 1104 of comparing the predicted action to a ground truth action. For example, the act 1104 involves training the supervised machine learning model comprising the latent representation decoder to generate actions by comparing the predicted action to a ground truth action corresponding to the first training current state and the first training next state.

In one or more embodiments, the series of acts 1100 also includes acts for training the supervised machine learning model by modifying internal parameters of the latent representation decoder using a loss function, based on comparing the predicted action to the ground truth action corresponding to the first training current state and the first training next state. In further embodiments, the series of acts 1100 also includes acts for training the supervised machine learning model by modifying internal parameters of the latent representation generator using a loss function, based on comparing the predicted action to the ground truth action corresponding to the first training current state and the first training next state.

The series of acts 1100 also includes the act 1106 of generating a latent representation utilizing a state-based latent representation generation policy. For example, the act 1106 involves utilizing a latent representation policy gradient model to train a state-based latent representation generation policy to generate latent representations for use in generating proposed digital actions by generating a latent representation from a second training current state utilizing the state-based latent representation generation policy. In one or more embodiments, the first training current state and the second training current state are the same. In some embodiments, the latent representation comprises a value from a set of continuous values corresponding to a plurality of discrete actions associated with the second training current state and the plurality of discrete actions associated with the second training current state comprises the proposed action.

The series of acts 1100 further includes the act 1108 of utilizing a latent representation decoder to generate a proposed action. For example, the act 1108 involves utilizing the latent representation policy gradient model to train the state-based latent representation generation policy to generate latent representations for use in generating proposed digital actions by utilizing the latent representation decoder of the supervised machine learning model to generate a proposed action from the latent representation. In one or more embodiments, the ground truth action and the proposed action are the same.

Further, the series of acts 1100 includes the act 1110 of modifying the state-based latent representation generation policy using a policy gradient. For example, the act 1110 involves utilizing the latent representation policy gradient model to train the state-based latent representation generation policy to generate latent representations for use in generating proposed digital actions by modifying the state-based latent representation generation policy using a policy gradient, based on a second training next state and a training reward resulting from the proposed action. In one or more embodiments, the first training next state and the second training next state are the same.

In one or more embodiments, the series of acts 1100 further includes an act for utilizing the latent representation policy gradient model to train the state-based latent representation generation policy by determining the second training next state and the training reward based on execution of the proposed action. For example, in one or more embodiments, the series of acts include an act for providing the proposed action to a client device. Accordingly, determining the second training next state and the training reward based on execution of the proposed action comprises determining the second training next state and the training reward based on execution of the proposed action by the client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
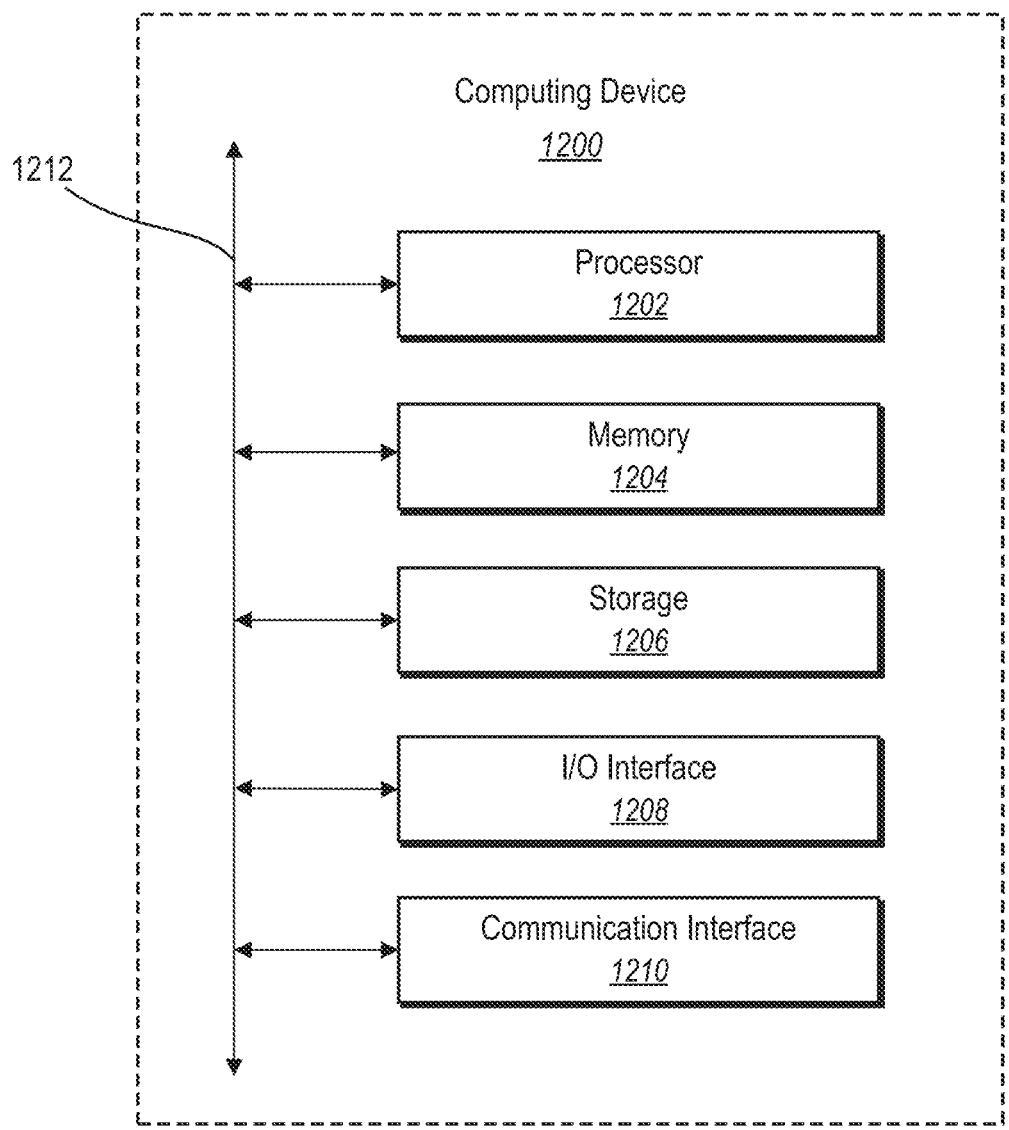
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, client devices 112a-112n, and the third-party network server 110). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method for generating and providing digital action recommendations based on digital embeddings of action spaces, comprising:

training a latent representation decoder via supervised machine learning to learn parameters for generating proposed digital actions associated with a discrete action space from one or more latent representations within a continuous action space by using a supervised machine learning model to update the parameters of the latent representation decoder based on, for each training iteration, a training current state, a training next state, a predicted action generated by the latent representation decoder based on the training current state and the training next state, and a ground truth action comprising a digital action that causes a transition from the training current state to the training next state;

training, with the latent representation decoder, a latent representation generator via the supervised machine learning to learn additional parameters for generating latent representations within the continuous action space from training current states and training next states by using the supervised machine learning model to update the additional parameters of the latent representation generator based on, for each training iteration, the training current state, the training next state, the predicted action generated by the latent representation decoder based on a latent representation generated by the latent representation generator from the training current state and the training next state, and the ground truth action;

training a state-based latent representation generation policy via reinforcement learning to learn further parameters for generating additional latent representations within the continuous action space from current states by using a latent representation policy gradient model, that includes the latent representation decoder, to update the further parameters of the state-based latent representation generation policy based on a training reward;

identifying, for a client device, a current state and a plurality of available actions associated with the discrete action space; and generating a proposed digital action from the plurality of available actions and the current state utilizing the state-based latent representation generation policy and the latent representation decoder.

2. The computer-implemented method of claim 1, wherein the current state of the client device comprises at least one of digital content previously distributed to the client device or steps previously taken with respect to a process.

3. The computer-implemented method of claim 1, wherein the proposed digital action comprises at least one of digital content to distribute or a step to take with respect to a process.

4. The computer-implemented method of claim 1, wherein identifying the current state of the client device comprises determining an initial state of the client device from an initial distribution of states.

5. A non-transitory computer readable storage medium comprising instructions that, when executed by at least one processor, cause a computing device to:
    identify a current state of a client device and a plurality of available actions; and
    generate a proposed digital action for the client device from the plurality of available actions by:
        generating, based on the current state of the client device and utilizing a state-based latent representation generation policy, a latent representation, wherein:
            the state-based latent representation generation policy is trained to generate latent representations from current states and includes parameters learned via reinforcement learning by using a latent representation policy gradient model to update the parameters of the state-based latent representation generation policy based on a training reward;
            the latent representation policy gradient model used for training the state-based latent representation generation policy via reinforcement learning comprises a latent representation decoder;
            the latent representation decoder is trained to generate proposed digital actions from one or more latent representations and includes additional parameters learned via supervised machine learning by using a supervised machine learning model to update the additional parameters of the latent representation decoder based on, for each training iteration, a training current state, a training next state, a predicted action generated by the latent representation decoder from the training current state and the training next state, and a ground truth action comprising a digital action that causes a transition from the training current state to the training next state; and
            the supervised machine learning model used for training the latent representation decoder via the supervised machine learning comprises a latent representation generator that generates additional latent representations from training current states and training next states and includes further parameters learned via the supervised machine learning by using the supervised machine learning model to update the further parameters of the latent representation generator based on, for each training iteration, the training current state, the training next state, the predicted action generated by the latent representation decoder based on an additional latent representation generated by the latent representation generator from the training current state and the training next state, and the ground truth action; and
        determining the proposed digital action from the plurality of available actions by analyzing the latent representation utilizing the latent representation decoder.

6. The non-transitory computer readable storage medium of claim 5, wherein:
    the plurality of available actions comprises a plurality of discrete actions, and
    the latent representation comprises a value from a set of continuous values corresponding to the plurality of discrete actions.

7. The non-transitory computer readable storage medium of claim 5, further comprising instructions that, when executed by the at least one processor, cause the client device to:
    identify a next state of the client device and a second plurality of available actions corresponding to the client device upon execution of the proposed digital action; and
    generate a second latent representation based on the next state of the client device utilizing the state-based latent representation generation policy.

8. The non-transitory computer readable storage medium of claim 7, further comprising instructions that, when executed by the at least one processor, cause the client device to determine a second proposed digital action from the second plurality of available actions by analyzing the second latent representation utilizing the latent representation decoder.

9. The non-transitory computer readable storage medium of claim 5, wherein the proposed digital action comprises at least one of digital content to distribute or a step to take with respect to a process.

10. The non-transitory computer readable storage medium of claim 5, further comprising instructions that, when executed by the at least one processor, cause the computing device to train the latent representation decoder via the supervised machine learning by, for a first training iteration:
    generating, utilizing the latent representation generator, a first latent representation based on a first training current state and a first training next state; and
    generating, utilizing the latent representation decoder, a first predicted action based on the first latent representation.

11. The non-transitory computer readable storage medium of claim 10, further comprising instructions that, when executed by the at least one processor, cause the computing device to train the latent representation decoder via the supervised machine learning by, for the first training iteration:
    determining a loss based on comparing the first predicted action with a first ground truth action that includes a first digital action that causes a first transition from the first training current state to the first training next state; and
    modifying parameters of the latent representation decoder based on the loss.

12. A system comprising:
    at least one processor; and
    at least one non-transitory computer readable storage medium storing instructions that, when executed by the at least one processor, cause the system to:
    train a latent representation decoder via supervised machine learning to generate actions associated with a discrete action space from one or more latent representations within a continuous space by learning parameters of the latent representation decoder and additional parameters of a latent representation generator over a plurality of training iterations that each use a training current state, a training next state, a predicted action generated by the latent representation decoder from the training current state and the training next state, and a ground truth action comprising a digital action that causes a transition from the training current state to the training next state by, for a first training iteration:
        utilizing a supervised machine learning model, that includes the latent representation decoder and the latent representation generator, to:
            generate a first latent representation from a first training current state and a first training next state via the latent representation generator; and generate a first predicted action from the first latent representation via the latent representation decoder; and modifying the parameters of the latent representation decoder and the additional parameters of the latent representation generator based on comparing the first predicted action to a first ground truth action, the first ground truth action comprising a first digital action that causes a transition from the first training current state to the first training next state; and utilize a latent representation policy gradient model that includes the latent representation decoder with the parameters modified via the supervised machine learning to train a state-based latent representation generation policy via reinforcement learning to generate, from current states and within the continuous space that corresponds to the discrete action space, latent representations for use in generating proposed digital actions by:

generating a second latent representation from a second training current state utilizing the state-based latent representation generation policy;

utilizing the latent representation decoder trained via the supervised machine learning to generate a proposed action from the second latent representation; and modifying the state-based latent representation generation policy using a policy gradient, based on a second training next state and a training reward resulting from the proposed action.

13. The system of claim 12, wherein:
the first training current state and the second training current state are a same training current state;
the first training next state and the second training next state are a same training next state; and
the ground truth action and the proposed action are a same action.

14. The system of claim 12, wherein modifying the state-based latent representation generation policy using the policy gradient comprises modifying further parameters of the state-based latent representation generation policy using the policy gradient without modifying the parameters of the latent representation decoder.

15. The system of claim 12, wherein modifying the additional parameters of the latent representation generator comprises modifying the additional parameters using a loss function, based on comparing the first predicted action to the first ground truth action, the first ground truth action corresponding to the first training current state and the first training next state.

16. The system of claim 14, wherein the latent representation generator comprises a neural network.

17. The system of claim 12, further comprising instructions that, when executed by the at least one processor, cause the system to utilize the latent representation policy gradient model to train the state-based latent representation generation policy by determining the second training next state and the training reward based on execution of the proposed action.

18. The system of claim 17,
further comprising instructions that, when executed by the at least one processor, cause the system to provide the proposed action to a client device,
wherein determining the second training next state and the training reward based on execution of the proposed action comprises determining the second training next state and the training reward based on execution of the proposed action by the client device.

19. The system of claim 12, wherein modifying the parameters of the latent representation decoder based on comparing the first predicted action to the first ground truth action comprises modifying the parameters of the latent representation decoder using a loss function.

20. The system of claim 12, wherein:
the second latent representation comprises a value from a set of continuous values corresponding to a plurality of discrete actions associated with the second training current state, and
the plurality of discrete actions associated with the second training current state comprises the proposed action.

* * * * *